(12) United States Patent
Ahn et al.

(10) Patent No.: US 9,408,197 B2
(45) Date of Patent: Aug. 2, 2016

(54) APPARATUS AND METHOD FOR TRANSMITTING CONTROL INFORMATION IN WIRELESS COMMUNICATION SYSTEM

(71) Applicant: Pantech Co., Ltd., Seoul (KR)

(72) Inventors: Jae Hyun Ahn, Seoul (KR); Ki Bum Kwon, Seoul (KR); Kang Suk Huh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 351 days.

(21) Appl. No.: 13/963,532

(22) Filed: Aug. 9, 2013

(65) Prior Publication Data

US 2014/0050134 A1 Feb. 20, 2014

(30) Foreign Application Priority Data

Aug. 16, 2012 (KR) .................. 10-2012-0089297
Feb. 28, 2013 (KR) .................. 10-2013-0022504

(51) Int. Cl.
*H04W 72/04* (2009.01)
*H04W 72/08* (2009.01)

(52) U.S. Cl.
CPC ........ *H04W 72/0413* (2013.01); *H04W 72/082* (2013.01)

(58) Field of Classification Search
None
See application file for complete search history.

(56) References Cited

U.S. PATENT DOCUMENTS

| 8,446,869 B2 | 5/2013 | Lee et al. | |
| 2012/0040715 A1* | 2/2012 | Fu | H04B 1/1027 455/553.1 |
| 2012/0069766 A1 | 3/2012 | Fu et al. | |
| 2012/0082140 A1* | 4/2012 | Lin | H04W 72/1215 370/336 |
| 2012/0087341 A1* | 4/2012 | Jang | H04W 28/04 370/331 |
| 2012/0163307 A1 | 6/2012 | Wang et al. | |
| 2012/0164948 A1* | 6/2012 | Narasimha | H04W 72/1215 455/63.1 |
| 2012/0176923 A1* | 7/2012 | Hsu | H04W 52/243 370/252 |
| 2012/0176924 A1 | 7/2012 | Wu et al. | |
| 2012/0182896 A1* | 7/2012 | Jang | H04W 28/048 370/252 |
| 2012/0195298 A1* | 8/2012 | Kuo | H04W 4/06 370/338 |
| 2012/0252442 A1* | 10/2012 | Fu | H04W 36/20 455/426.1 |
| 2013/0208641 A1* | 8/2013 | Baghel | H04B 1/109 370/311 |
| 2013/0288742 A1* | 10/2013 | Yao | H04J 11/0023 455/553.1 |

(Continued)

FOREIGN PATENT DOCUMENTS

KR  10-2010-0113435     10/2010
WO  WO 2012/094935  *  7/2012

OTHER PUBLICATIONS

Alcatel-Lucent et al., "Configuration of IDC Indication," R2-122746, TSG-RAN WG2#78, Prague, Czech Republic, May 21-25, 2012, <http://www.3gpp.org/ftp/tsg_ran/WG2_RL2/TSGR2_78/Docs/>.

(Continued)

*Primary Examiner* — Redentor Pasia
(74) *Attorney, Agent, or Firm* — H.C. Park & Associates, PLC

(57) ABSTRACT

Disclosed is a method and a apparatus for transmitting control information in a wireless communication system. The present invention includes detecting In Device Coexistence (IDC) interference, and transmitting an IDC indication message to an eNB if there is at least one frequency influenced by the IDC interference, wherein the IDC indication message is configured to include a frequency list containing frequencies influenced by the IDC interference, and the frequency list is configured to include an IDC interference direction indicating a direction of an influence of the detected IDC interference.

16 Claims, 23 Drawing Sheets

(56) References Cited

U.S. PATENT DOCUMENTS

2013/0303214 A1* 11/2013 Ahmadi ............ H04W 72/1215
 455/501
2013/0322260 A1* 12/2013 Yao ..................... H04W 72/082
 370/241
2014/0036745 A1* 2/2014 Koo ...................... H04W 16/14
 370/311

OTHER PUBLICATIONS

International Search Report issued in PCT Application No. PCT/KR2013/007137, dated Nov. 19, 2013.

* cited by examiner

APPARATUS AND METHOD FOR TRANSMITTING CONTROL INFORMATION IN WIRELESS COMMUNICATION SYSTEM

CROSS-REFERENCE TO RELATED APPLICATIONS

This application claims priority from and the benefit under 35 U.S.C. §119(a) of Korean Patent Application Number 10-2012-0089297 filed on Aug. 16, 2012, and Korean Patent Application Number 10-2013-0022504 filed on Feb. 28, 2013, which are incorporated by reference for all purposes as if fully set forth herein.

BACKGROUND

1. Field of the Invention

The present invention relates to a wireless communication system, and more particularly, to an apparatus and a method for transmitting control information in a wireless communication system.

2. Discussion of the Background

In general, a wireless communication system uses one bandwidth for data transmission. For example, a 2nd generation wireless communication system uses a bandwidth of 200 KHz to 1.25 MHz, and a 3rd generation wireless communication system uses a bandwidth of 5 MHz to 10 MHz. In order to support an increasing transmission capacity, the bandwidth of a recent 3rd Generation Partnership Project (3GPP) Long Term Evolution (LTE) or Institute of Electrical and Electronics Engineers (IEEE) 802.16m continues to extend up to 20 MHz or higher. To increase a bandwidth so as to increase a transmission capacity can be considered to be indispensable, but to support a great bandwidth even when necessary quality of service is low may result in great power consumption.

Therefore, there is emerging a multiple component carrier system in which a carrier having one bandwidth and a center frequency is defined and data can be transmitted or received through a plurality of the carriers using a wide band. A multiple component carrier system supports both a narrow band and a wide band by using one or more carriers. For example, if one carrier corresponds to a bandwidth of 5 MHz, a maximum of a 20 MHz bandwidth is supported by using four carriers.

Users at different areas can access different networks with the help of recent ubiquitous access networks and can continue to maintain access. A user who performs communication with one network system through one user equipment (UE) carries different devices supporting respective network systems. As the function of a recent single UE is advanced and complicated, a user can perform communication with a plurality of network systems using only one UE simultaneously, thereby increasing user convenience.

If one UE performs communication in a plurality of network system bans simultaneously, IDC interference can be generated. IDC interference means interference in which transmission in one frequency band interferes with reception in the other frequency band within the same UE. For example, if one UE supports a Bluetooth system and an 802.16 system at the same time, IDC interference can be generated between a Bluetooth system band and an 802.16 system band. IDC interference can be commonly generated when an interval between the frequency band boundaries of different network systems is not sufficient wide.

When In-Device Coexistence (IDC) interference occurs, a UE transmits IDC assistance information to a base station (eNB) so that the IDC-related control operation may be performed. Here, it may be determined that the triggering on the IDC assistance information transmission is generated by an internal operation of the UE, and if the IDC assistance information is too frequently transmitted, resources may be wasted.

SUMMARY

An object of the present invention is to provide an apparatus and a method for transmitting control information in consideration of whether In-Device Coexistence (IDC) interference occurs.

Another object of the present invention is to provide an apparatus and a method for selectively transmitting control information on the IDC interference.

Another object of the present invention is to provide an apparatus and a method for transmitting control information on the IDC interference including information on an IDC interference direction.

Another object of the present invention is to provide an apparatus and a method for transmitting information indicating an occurrence state of the IDC interference.

According to present invention, the problem of IDC interference can be solved more efficiently by transmitting assistance information on the IDC interference including information on the direction that the IDC interfere influences.

An aspect of the present invention, a method of transmitting control information by a user equipment (UE) in a wireless communication system is provided. The method includes configuring an "In Device Coexistence" (IDC) indication message including an affected carrier frequency list, and transmitting the IDC indication message to an eNB, wherein the affected carrier frequency list includes at least one affected carrier frequency information element, each affected carrier frequency information element comprises a value of a carrier frequency affected by an IDC interference and an interference direction indicator indicating a direction of the IDC interference regarding the affected carrier frequency.

Another aspect of the present invention, a user equipment (UE) for transmitting control information in a wireless communication system is provided. The UE includes a transmission unit which transmits, to an eNB, an "In Device Coexistence" (IDC) indication message including an affected carrier frequency list, and a controller which configures the IDC indication message, wherein the affected carrier frequency list includes at least one affected carrier frequency information element, each affected carrier frequency information element comprises a value of a carrier frequency affected by an IDC interference and an interference direction indicator indicating a direction of the IDC interference regarding the affected carrier frequency.

Yet another aspect of the present invention, a method of transmitting control information by an eNB in a wireless communication system is provided. The method includes receiving an "In Device Coexistence" (IDC) indication message including an affected carrier frequency list from a user equipment (UE) which detects an IDC interference, and determining an IDC solution based on the IDC indication message, wherein the affected carrier frequency list includes at least one affected carrier frequency information element, each affected carrier frequency information element comprises a value of a carrier frequency affected by an IDC interference and an interference direction indicator indicating a direction of the IDC interference regarding the affected carrier frequency.

Yet another aspect of the present invention, an eNB for transmitting control information in a wireless communication system is provided. The eNB includes a reception unit that receives an "In Device Coexistence" (IDC) indication message including an affected carrier frequency list from a user equipment (UE) that detects an IDC interference, an IDC solution determination unit that determines an IDC solution based on the IDC indication message, wherein the affected carrier frequency list includes at least one affected carrier frequency information element, each affected carrier frequency information element comprises a value of a carrier frequency affected by an IDC interference and an interference direction indicator indicating a direction of the IDC interference regarding the affected carrier frequency.

DETAILED DESCRIPTION OF THE ILLUSTRATED EMBODIMENTS

Figure 1:
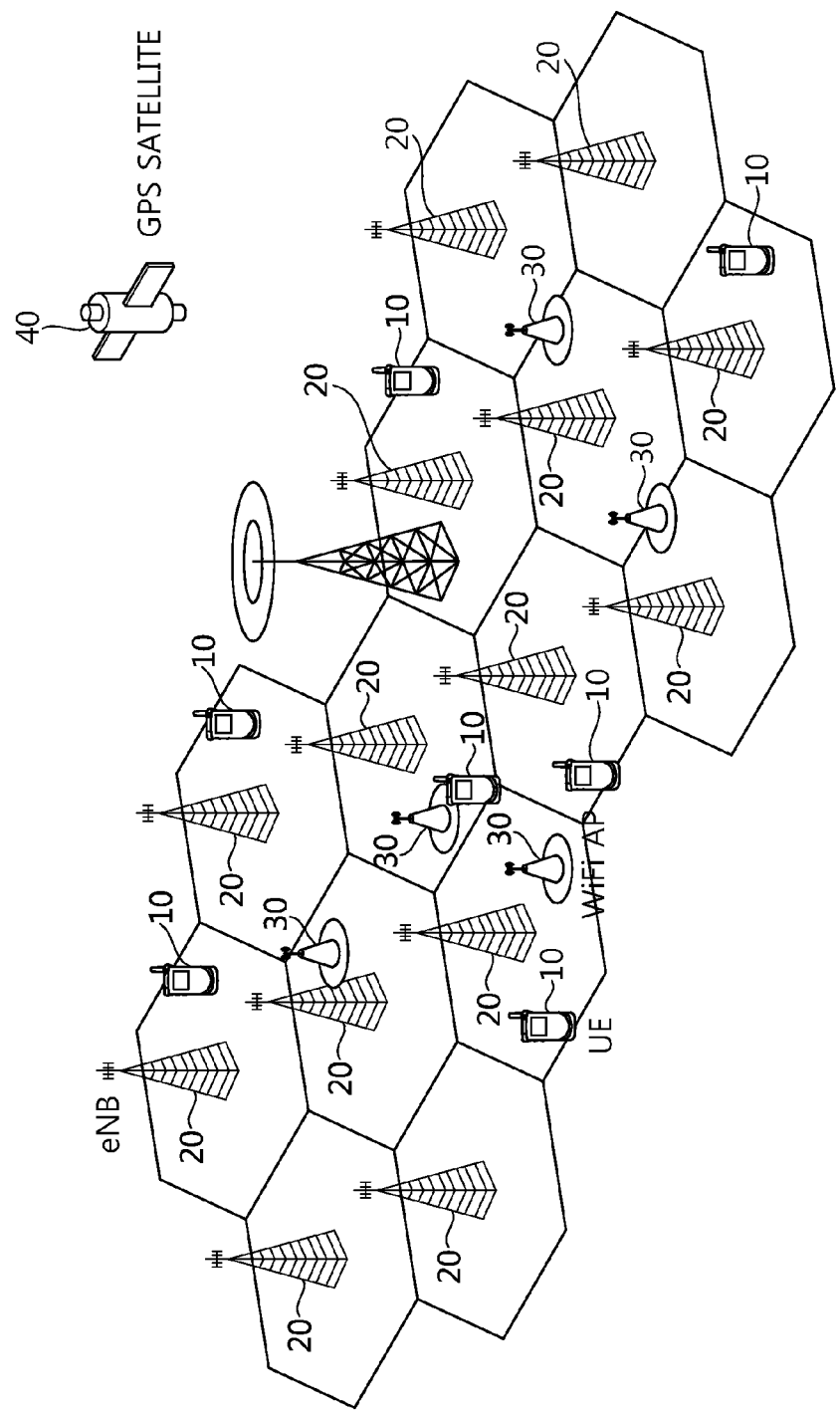
FIG. 1 illustrates a wireless communication system according to exemplary embodiments of the present invention.

FIG. 1 illustrates a wireless communication system according to exemplary embodiments of the present invention.

Referring to FIG. 1, the wireless communication system is widely placed in order to provide various communication services including voice, packet, data, and the like, and includes a user equipment (UE) 10, a base station (called as a evolved NodeB (eNB) or BS) 20, a wireless LAN access point (AP) 30, a global positioning system (GPS) 40, and a satellite. Herein, a wireless LAN is a device supporting IEEE 802.11 technology which a wireless standard and the IEEE 802.11 may be mixed with a WiFi system.

The UE 10 may be positioned in coverage of a plurality of networks including a cellular network, a wireless LAN broadcast network, a satellite system, and the like. The UE 10 is provided with a plurality of wireless transceivers in order to access various networks and various services regardless of place and time. For example, a smart phone is provided with long term evolution (LTE), WiFi Bluetooth transceiver, and a GPS receiver.

Hereinafter, a downlink (DL) indicates communication from the eNB 20 and an uplink (UL) indicates communication from the UE 10 to the eNB 20. In the downlink, a transmitter may be a part of the eNB 20 and a receiver may be a part of the UE 10. In the uplink, the transmitter may be a part of the UE 10 and a receiver may be a part of the eNB 20.

The UE 10 may be fixed or have mobility, and may be called other terms such as a mobile station (MS), a user terminal (UT), a subscriber station (SS), a mobile terminal (MT), a wireless device, and the like. The eNB 20 indicates a fixed station that communicates with the UE 10 and may be called other terms such as a base station (BS), a base transceiver system (BTS), an access point, a femto base station (BS), a relay, and the like.

Multiple access techniques applied to the wireless communication system are not limited. Various multiple access techniques such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA may be used. In uplink transmission and downlink transmission, a time division duplex (TDD) scheme in which transmission is performed by using different times may be used or a frequency division duplex (FDD) scheme in which transmission is performed by using different frequencies may be used.

Figure 2:
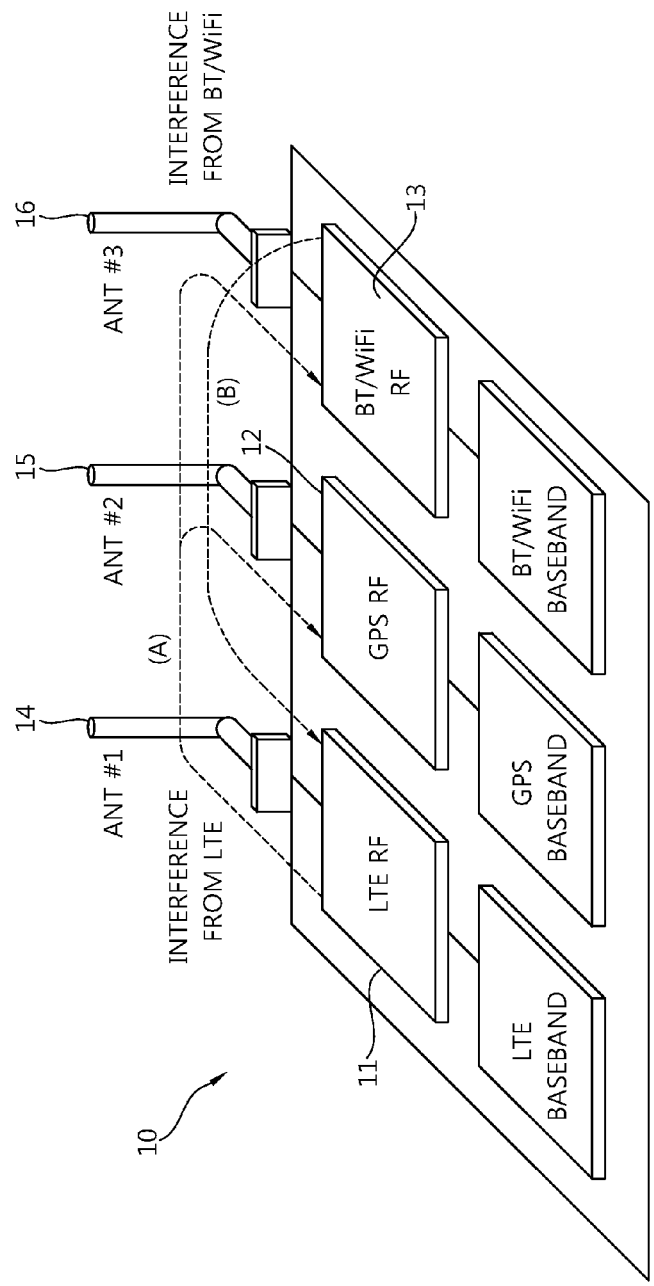
FIG. 2 is an explanatory diagram describing in-device coexistence interference.

FIG. 2 is an explanatory diagram describing in-device coexistence interference.

Referring to FIG. 2, the UE 10 includes an LTE RF 11, a GPS RF 12, and a Bluetooth/WiFi RF 13. Transceiving antennas 14, 15, and 16 are connected to the respective RFs. That is, various types of RFs are closely mounted in one device platform. Herein, transmission power of one RF may be much larger than a reception power level into another RF receiver. In this case, if an interval in frequency between the RFs is not sufficient and a filtering technique is not supported, a transmission signal of any RF may cause remarkable interference in a receiver of another RF within the device. For example, 'A' is an example in which the transmission signal of the LTE RF 11 causes the in-device coexistence interference in the GPS RF 12 and the Bluetooth/WiFi RF 13 and 'B' is an example in which the transmission signal of the Bluetooth/WiFi RF 13 causes the in-device coexistence interference in the LTE RF 11.

Figure 3:
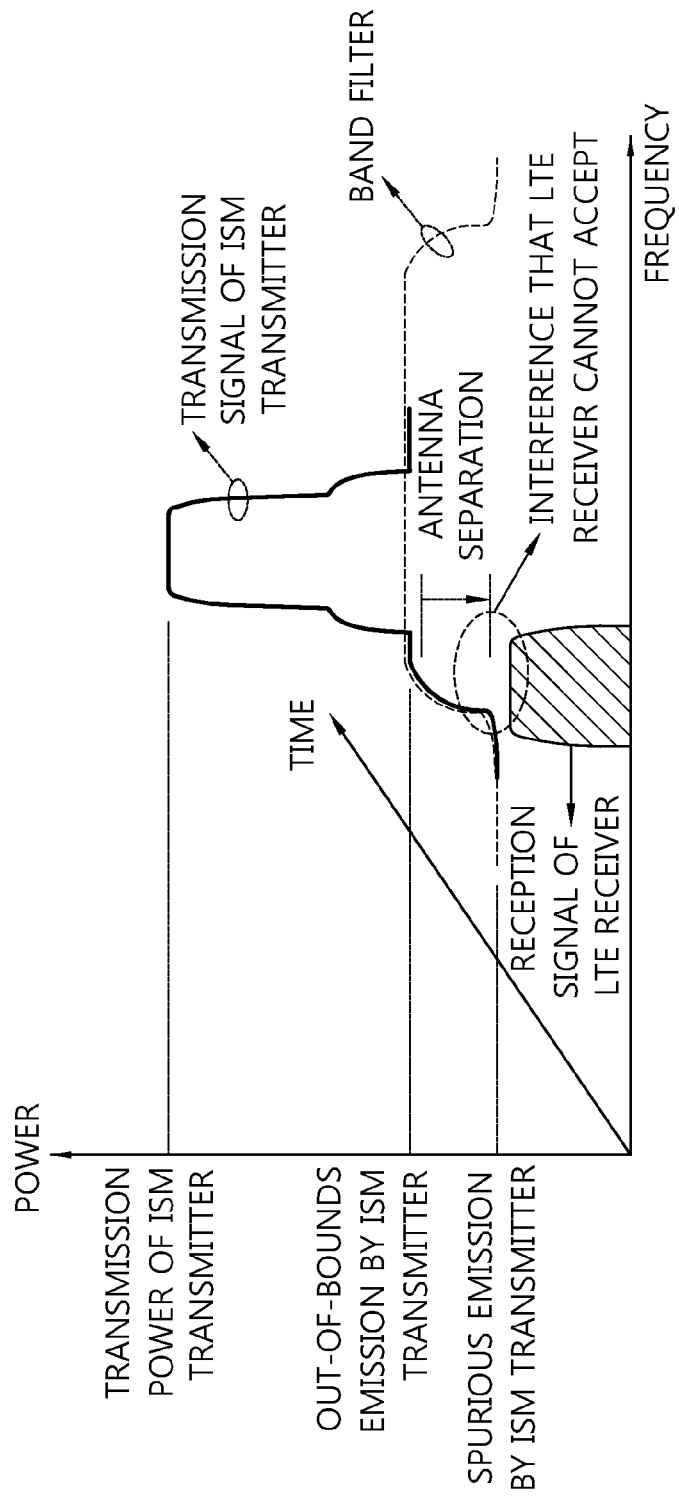
FIG. 3 is an example illustrating the in-device coexistence interference from an industrial, scientific and medical (ISM) transmitter to an LTE receiver.

FIG. 3 is an example illustrating the in-device coexistence interference from an industrial, scientific and medical (ISM) transmitter to an LTE receiver. The ISM band indicates a band which may be arbitrarily used without authorizing the use in industrial, scientific, and medical fields.

Referring to FIG. 3, a band of a signal received by the LTE receiver overlaps with a band of a transmission signal of the ISM transmitter. In this case, the in-device coexistence interference may occur. In particular, in frequency bands F1 to F3, when a signal is received at the LTE receiver, the overlap represents a situation where an interference unacceptable at the LTE receiver occurs due to the ISM transmitter in F2 and F3. The F1 to F3 can be frequency bands which belong to a single band. But F1 is located out of the region where affection of the In-Device Coexistence (IDC) interference is severe. F2 and F3, however, are located in the region where the influence of the IDC is severe. That is, the IDC problem can vary frequency to frequency even in the same band according to the characteristics of a band filter.

Figure 4:
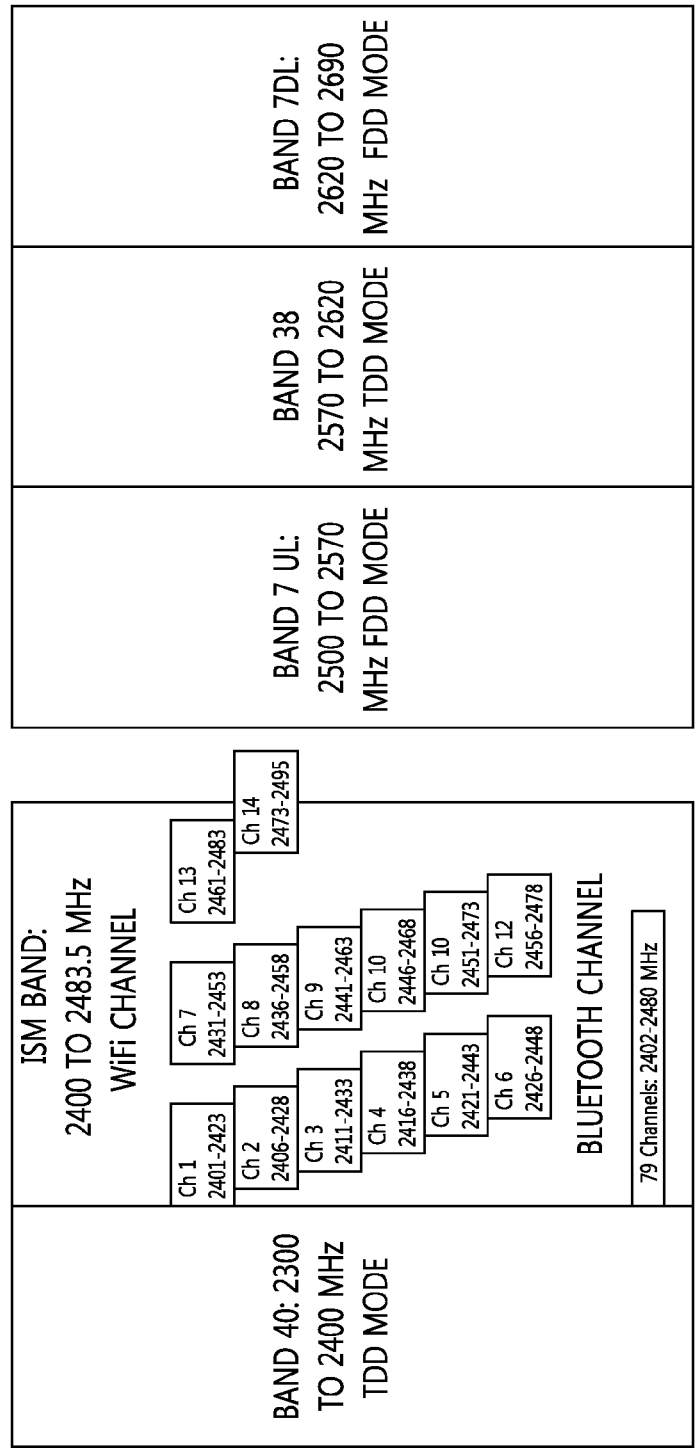
FIG. 4 is an example in which a band is divided into an ISM band and an LTE band on a frequency band.

FIG. 4 is an example in which a band is divided into an ISM band and an LTE band on a frequency band.

Referring to FIG. 4, a band 40, a band 7, and a band 38 are LTE bands. The band 40 occupies a band in the range of 2300 to 2400 MHz in a TDD mode and the band 7 occupies a band in the range of 2500 to 2570 MHz as the uplink in an FDD mode. In addition, the band 38 occupies a band in the range of 2570 to 2620 MHz in the TDD mode. Meanwhile, the ISM band is used as a WiFi channel and a Bluetooth channel, and occupies a band in the range of 2400 to 2483.5 MHz. Herein, a condition in which the in-device coexistence interference occurs is illustrated in Table 1 below.

TABLE 1

| Interference band | Pattern of interference |
|---|---|
| Band 40 | ISM Tx -> LTE TDD DL Rx |
| Band 40 | LTE TDD UL Tx -> ISM Rx |
| Band 7 | LTE FDD UL Tx -> ISM Rx |
| Band 7/13/14 | LTE FDD UL Tx -> GPS Rx |

Referring to Table 1, a mark of 'a→b' in the interference pattern illustrates a condition in which a transmitter a causes the in-device coexistence interference to a receiver b.

Therefore, in the band 40, the ISM transmitter causes the in-device coexistence interference to an LTE-band downlink TDD receiver (LTE DL TDD Rx). The in-device coexistence interference may be alleviated to some extent by a filtering scheme, but is not sufficient to alleviate the in-device coexistence interference. When a frequency division multiplex (FDM) scheme is additionally applied to the filtering scheme, the in-device coexistence interference may be more efficiently alleviated.

Figure 5:
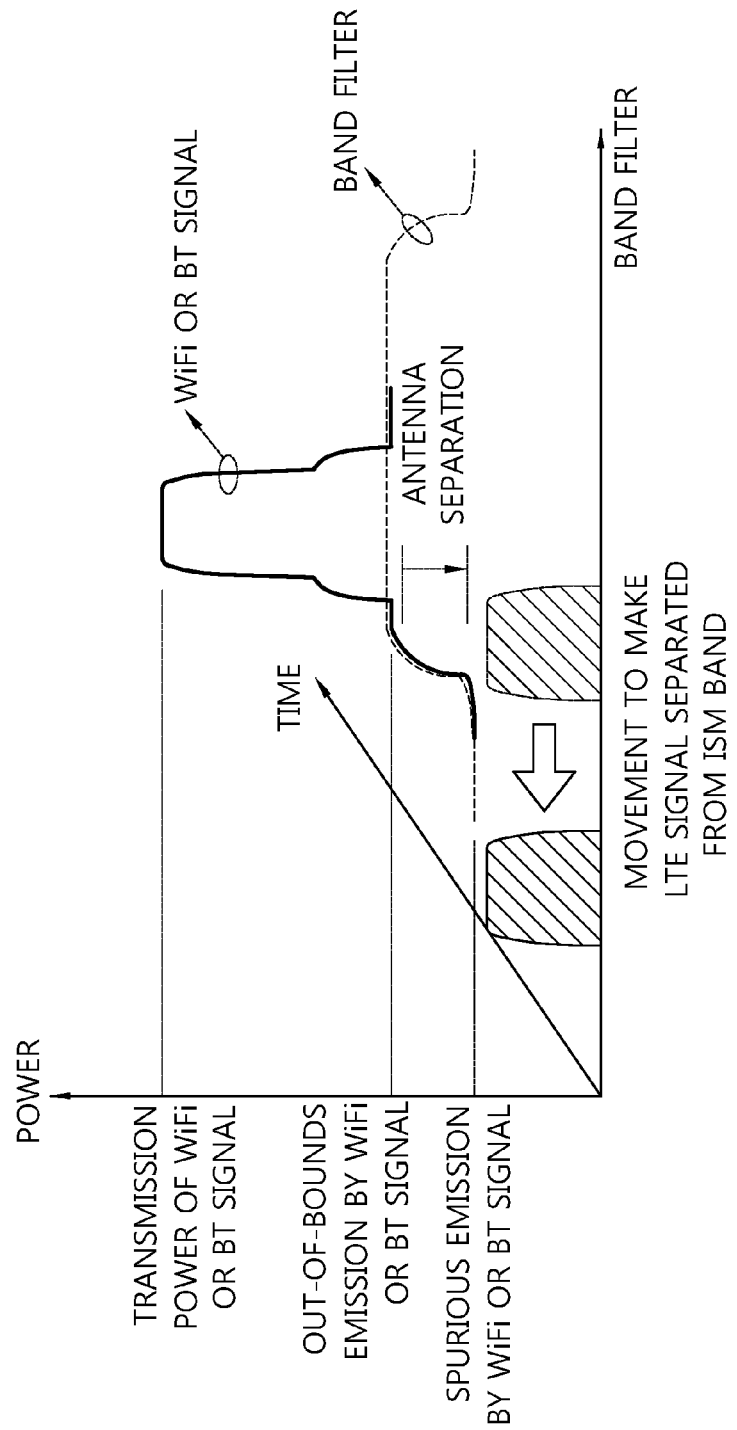
FIG. 5 is an explanatory diagram illustrating one example of alleviating the in-device coexistence interference by using an FDM scheme according to the present invention.

FIG. 5 is an explanatory diagram illustrating one example of alleviating the in-device coexistence interference by using an FDM scheme according to the present invention.

Referring to FIG. 5, the LTE band may be moved so as to prevent the LTE band and the ISM band from overlapping with each other. As a result, a handover of the UE is induced from the ISM band. However, to this end, a method in which legacy measurement or new signaling accurately triggers a mobility procedure or a radio link failure (RLF) procedure is required. Alternatively, a part which becomes a problem associated with the ISM in the LTE band may be avoided through a filtering or resource allocation technique. Alternatively, overlapping interference may be avoided with respect to a case in which LTE carriers are compiled through a procedure of reconfiguring a set of used carriers.

Figure 6:
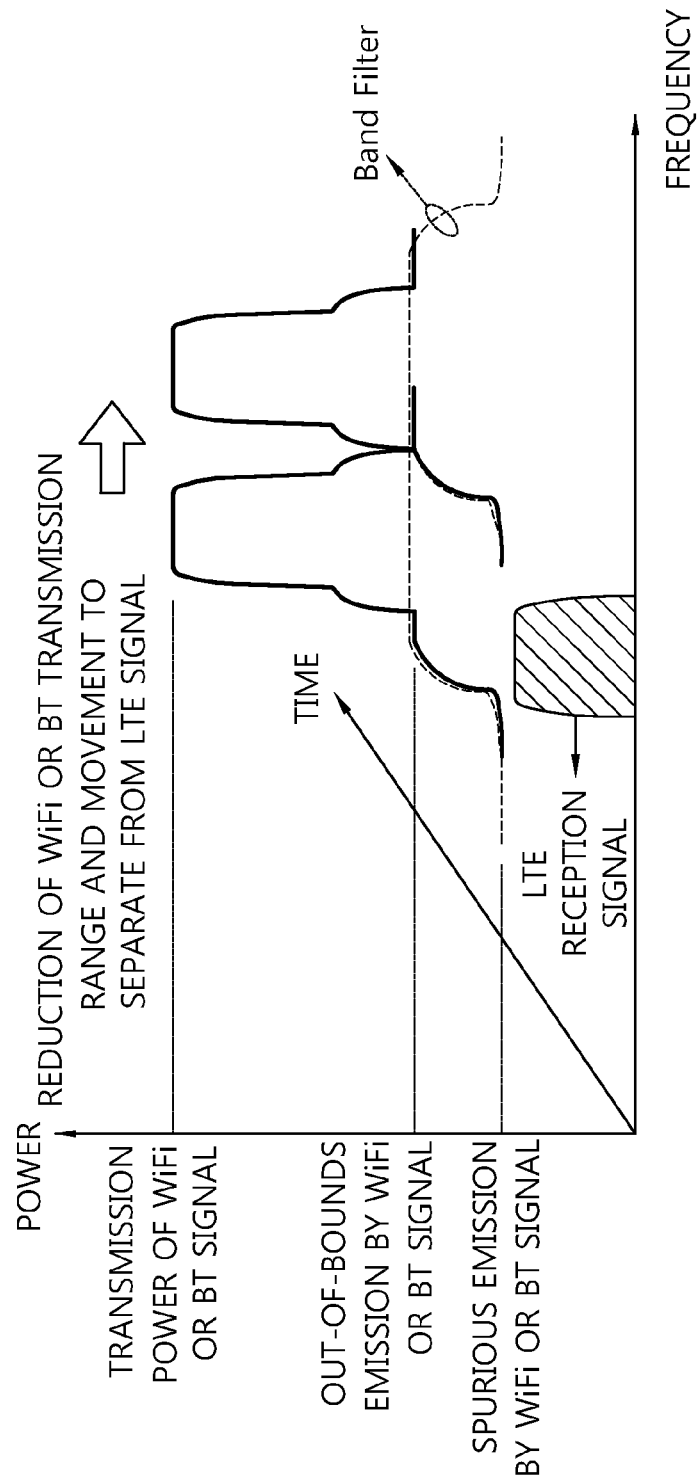
FIG. 6 is an explanatory diagram illustrating another example of alleviating the in-device coexistence interference by using the FDM scheme according to the present invention.

FIG. 6 is an explanatory diagram illustrating another example of alleviating the in-device coexistence interference by using the FDM scheme according to the present invention.

Referring to FIG. 6, the ISM band may be reduced and moved so as to be spaced apart from the LTE band.

However, in this scheme, backward compatibility problem may occur. In the case of the Bluetooth, the backward compatibility problem may be resolved due to an adaptive frequency hopping mechanism to some extent, but in the case of the WiFi, it may be difficult to resolve the backward compatibility problem.

Figure 7:
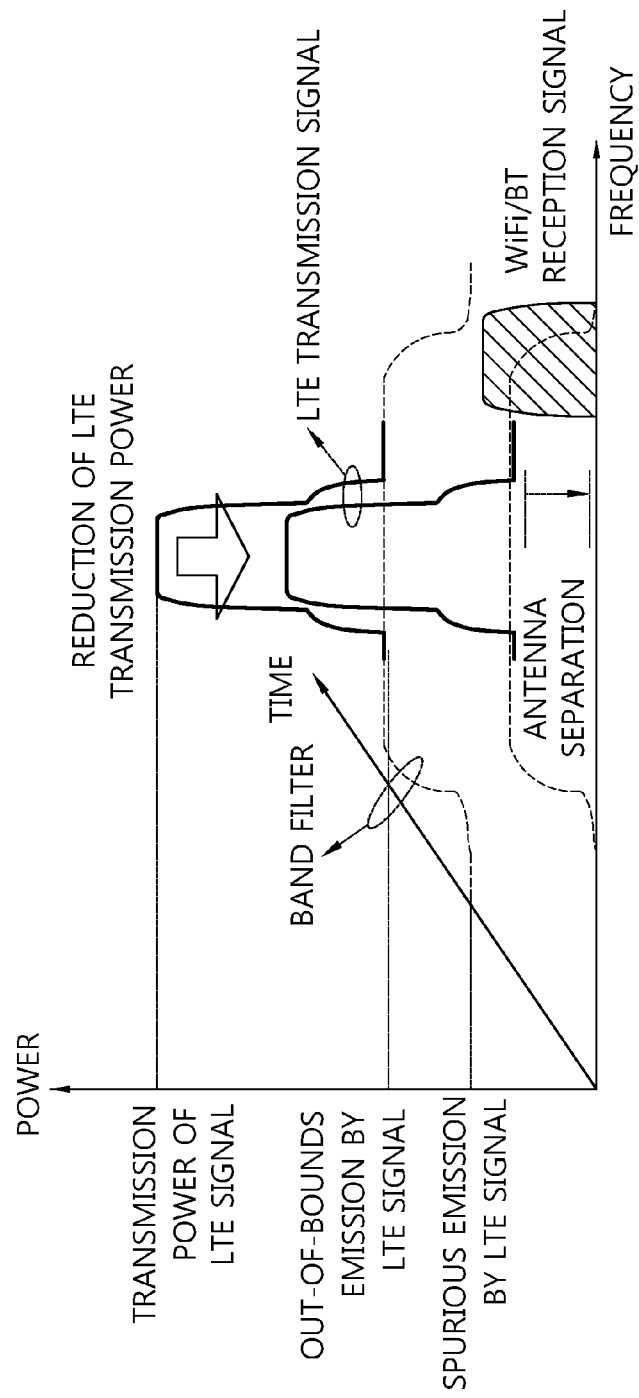
FIGS. 7 and 8 are explanatory diagrams illustrating one example of alleviating the in-device coexistence interference by using a power control (PC) scheme according to the present invention.
Figure 8:
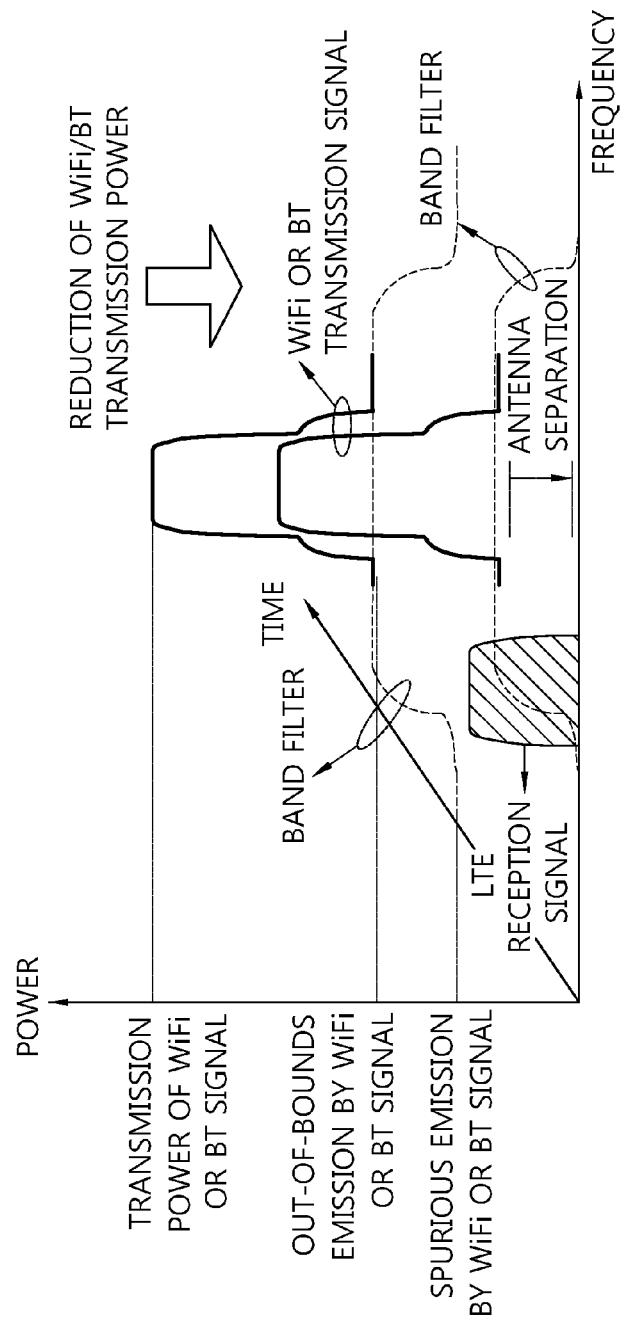

FIGS. 7 and 8 are explanatory diagrams illustrating one example of alleviating the in-device coexistence interference by using a power control (PC) scheme according to the present invention.

Referring to FIG. 7, the UE avoids the in-device coexistence interference by lowering transmission power of the LTE signal by a predetermined level to improve reception quality of the ISM band and referring to FIG. 8, the UE avoids the in-device coexistence interference by lowering transmission power of the ISM band by a predetermined level to improve reception quality of the LTE signal.

Figure 9:
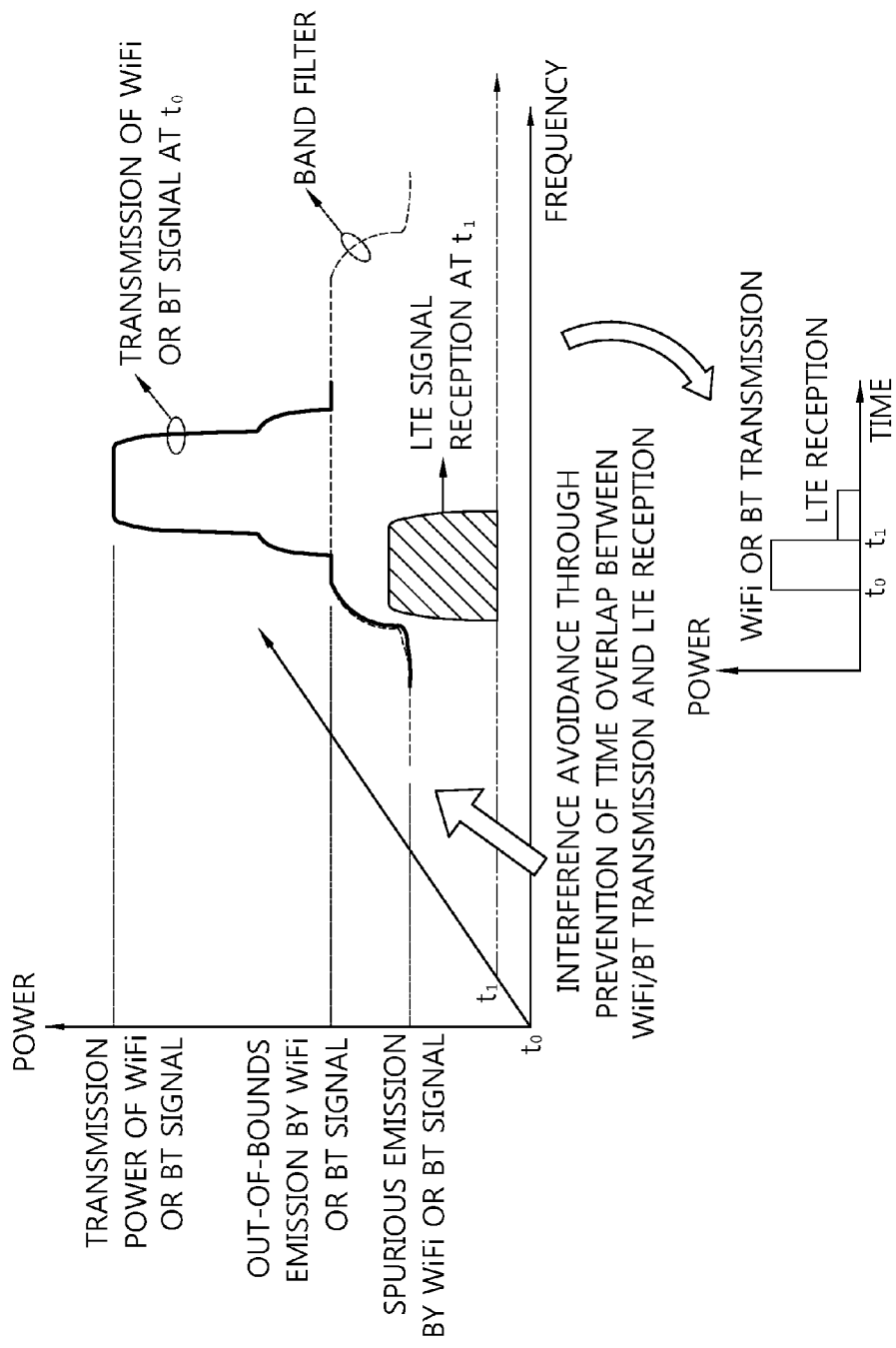
FIG. 9 is an explanatory diagram illustrating one example of alleviating the in-device coexistence interference according to the present invention.

FIG. 9 is an explanatory diagram illustrating one example of alleviating the in-device coexistence interference according to the present invention.

Referring to FIG. 9, when a reception time of the LTE signal is prevented from overlapping with a transmission time in the ISM band, the in-device coexistence interference may be avoided. For example, when the signal in the ISM band is transmitted at t0, the LTE signal is received at t1.

Figure 10:
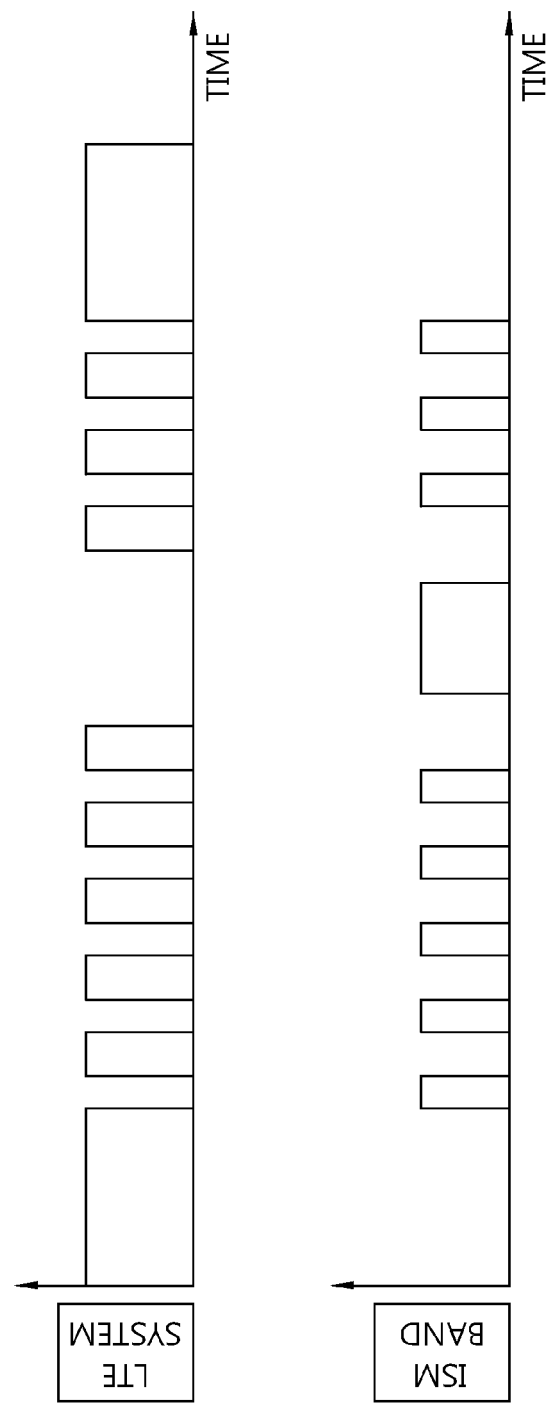
FIG. 10 is an explanatory diagram illustrating one example of transmission/reception timings on time axes in the LTE band and the ISM band using the TDM scheme according to the present invention.

FIG. 10 is an explanatory diagram illustrating one example of transmission/reception timings on time axes in the LTE band and the ISM band using the TDM scheme according to the present invention.

Referring to FIG. 10, the in-device coexistence interference may be avoided without movement between the LTE band and the ISM band by using the scheme of FIG. 9.

Figure 11:
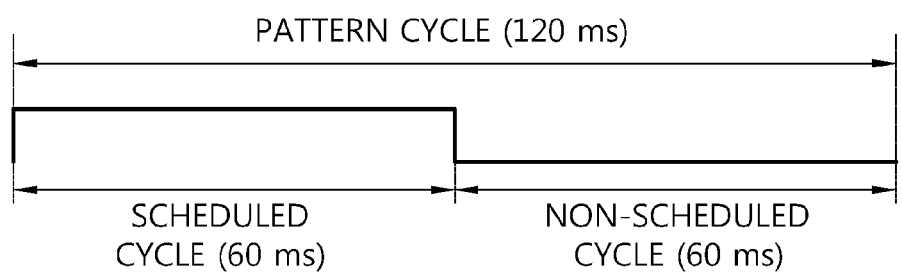
FIG. 11 is a diagram illustrating another example of alleviating the in-device coexistence interference according to the present invention.

FIG. 11 is a diagram illustrating another example of alleviating the in-device coexistence interference according to the present invention.

Referring to FIG. 11, a predetermined pattern periodicity interval is divided into a scheduled period interval and an unscheduled period interval to avoid the in-device coexistence interference by the TDM scheme based on discontinuous reception (DRX).

Mutual interference between the LTE and the ISM is avoided by preventing the LTE from being transmitted within the unscheduled period interval. However, primary LTE transmission such as random access and hybrid automatic repeat request (HARQ) retransmission may be permitted even within the scheduled period interval.

Mutual interference between the LTE and the ISM is avoided by preventing the ISM from being transmitted and permitting the LTE to be transmitted within the scheduled period interval. The primary ISM transmission such as Beacon or WiFi may be permitted even within the scheduled period interval, similarly as the unscheduled period interval.

The LTE transmission may be prevented in order to protect the primary ISM transmission. Special signaling for protecting the primary ISM transmission such as Beacon may be added. As one example, a period of the Beacon signaling and information on a subframe offset may be added. In this case, the subframe offset number and the system frame number may be determined based on '0'. The system frame number may have one of '0' to '1023' by the unit of a radio frame in the LTE system. One radio frame is constituted by ten subframes. When the corresponding subframe offset number and system frame number are known, an accurate frame position may be known in the corresponding system. The corresponding period or offset may be used as information to choose proper DRX period of DRX offset.

Figure 12:
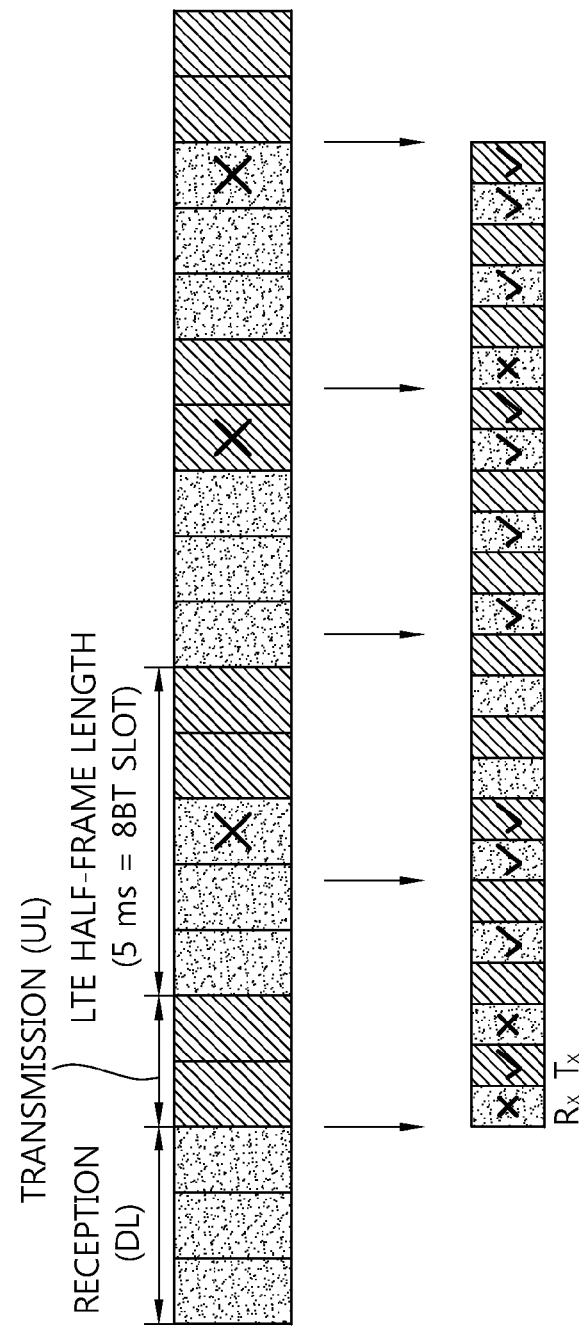
FIG. 12 is a diagram illustrating yet another example of alleviating the in-device coexistence interference according to the present invention.

FIG. 12 is a diagram illustrating yet another example of alleviating the in-device coexistence interference according to the present invention.

Referring to FIG. 12, by an autonomously denial scheme, when the in-device coexistence interference occurs in the UE, transmission of the LTE is denied in order to protect the reception of the ISM. Herein, a ticked part means that transmission or reception is approved and a part marked by 'X' means that transmission or reception is denied. As an example, even though UL transmission is granted from the eNB, the UE denies granting not to perform UL transmission in order to protect the reception of the ISM. Similarly, transmission of the ISM is denied in order to protect the reception of the LTE.

Figure 13:
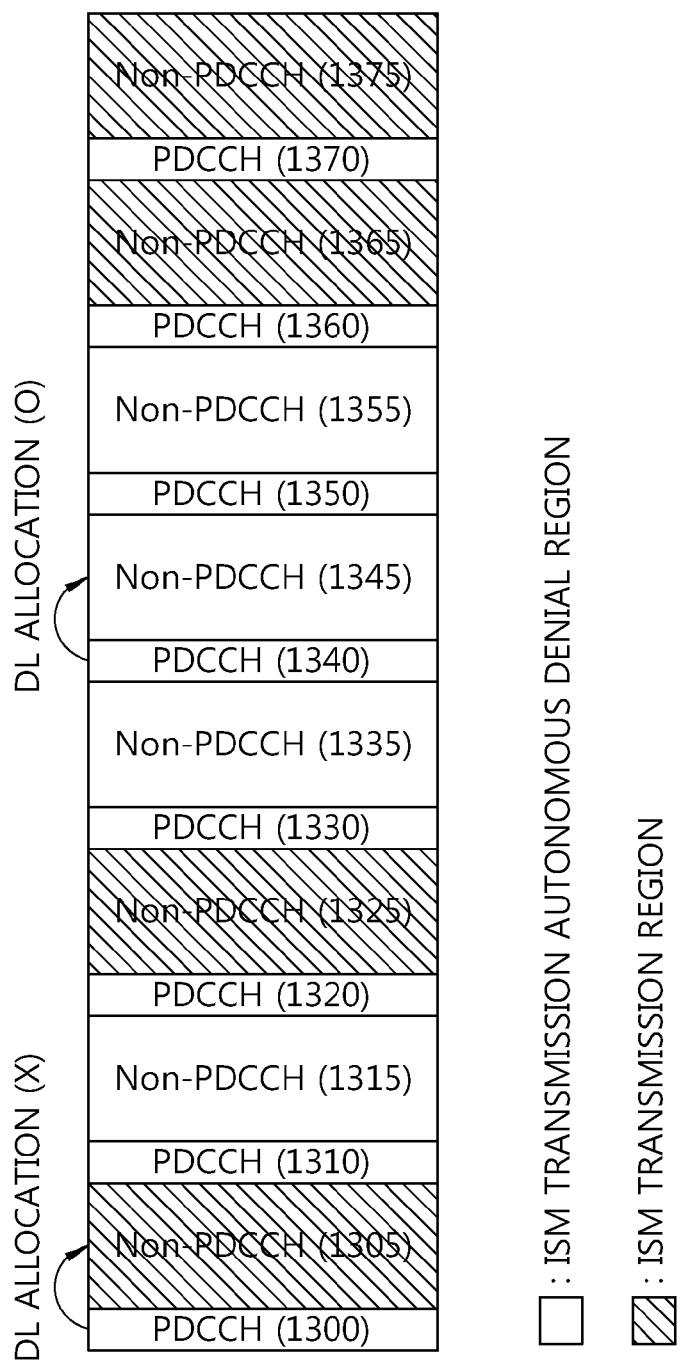
FIG. 13 is a diagram illustrating yet another example of alleviating the in-device coexistence interference according to the present invention.

FIG. 13 is a diagram illustrating yet another example of alleviating the in-device coexistence interference according to the present invention.

Referring to FIG. 13, by an partially autonomously denial scheme, transmission of the LTE subframe is partially denied based on a Physical Downlink Control Channel (PDCCH) in order to protect the reception of the ISM.

In principle, a UE denies ISM transmission when receiving PDCCH region of LTE. However, if downlink resource allocation is not existed in subframe ordered by PDCCH region, ISM transmission is not needed to denied but permitted in the PDCCH region. Here, the PDCCH region means a region combining a resource region including control information such as resource allocation or grant and a region needed to decode the control information.

In LTE case, PDCCH region means combining the number of OFDM symbol used for transmitting PDCCH which is transmitted by Physical Control Format Indicator Channel (PCFICH) and a region needed to decode PDCCH in the UE.

At this time, the size of the region needed to decode PDCCH in the UE may be changed based on the UE implementation, but may not be over one subframe.

In each of PDCCH region (1300, 1310, 1320, 1330, 1340, 1350, 1360, 1370), ISM transmission may be denied.

Also, a UE judges whether downlink resource allocation exists in non-PDCCH region (1305, 1315, 1325, 1335, 1345, 1355, 1365, 1375) which is indicated by each of PDCCH region (1300, 1310, 1320, 1330, 1340, 1350, 1360, 1370).

In non-PDCCH region (1315, 1335, 1345, 1355), downlink resource allocation exists in non-PDCCH region. However, in non-PDCCH region (1305, 1325, 1365, 1375) downlink resource allocation is not existed in non-PDCCH region.

That is, in some of non-PDCCH region, ISM transmission is partially denied. In others of non-PDCCH region (1305, 1325, 1365, 1375), ISM transmission is permitted.

Figure 14:
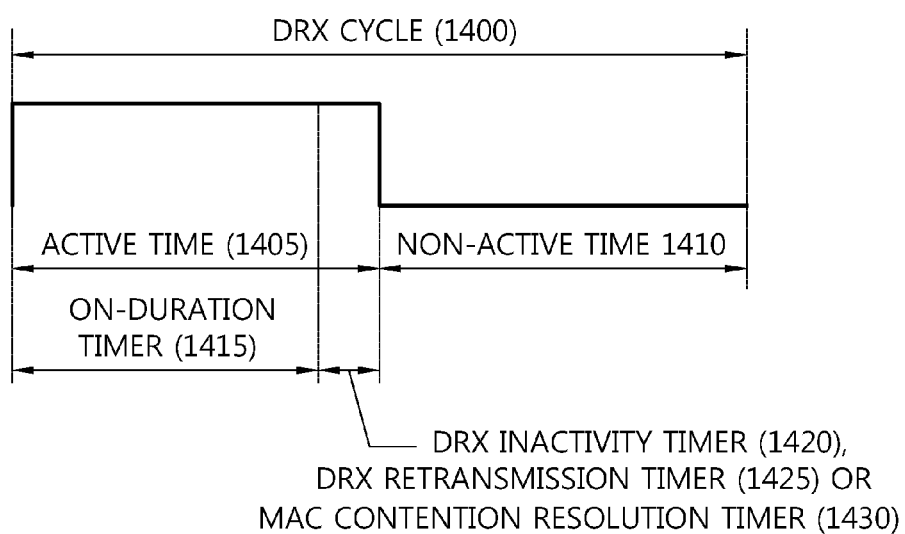
FIGS. 14 and 15 show an example of a DRX operation according to the present invention.
Figure 15:
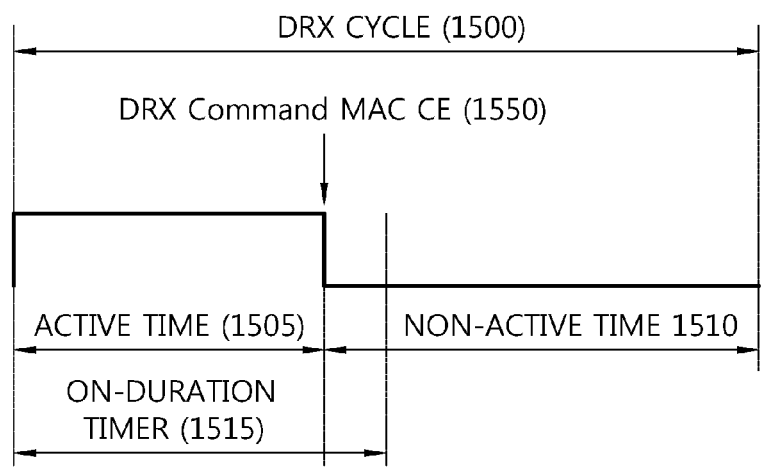

FIGS. 14 and 15 show an example of a DRX operation according to the present invention.

Referring to FIG. 14, a DRX cycle 1400 means a cycle in which the DRX operation is performed, and as one example, there is a long DRX cycle, which is applied in the range between 10 subframes to 2560 subframes, and as another example, there is a short DRX cycle, which is applied in the range of 2 subframes to 640 subframes. In this case, the short DRX cycle is applied for the DRX operation only while a DRX short cycle timer (drxShortCycleTimer) operates, and in the range falling outside of the DRX short cycle timer, the long DRX cycle is applied. Here, the basic unit of the DRX short cycle timer is one short DRX cycle. That is, if the length of the short DRX cycle is 10, the time becomes "10drxShort-CycleTimer". At this time, the range of the length of the short DRX cycle is from 1 to 16.

The active time 1405 means the total time during which a UE is awake to receive the PDCCH. The active time means the time during which an on-duration timer 1415 of the UE operates, or time which additionally includes time during which a timer, such as a DRX inactivity timer (drx-InactivityTimer) 1420, a DRX retransmission timer (drx-RetransmissionTimer) 1425, or a MAC contention resolution timer (mac-ContentionResolutionTimer) 1430, is operated.

A non-active time 1410 means time that is not the active time 1405 of the DRX cycle 1400.

The timer unit of the DRX timer, such as the on-duration timer 1415, the DRX inactivity timer 1420, or the DRX retransmission timer 1425, is a PDCCH subframe (psf). That is, the DRX timer is signaled or operated in a PDCCH subframe. Here, the PDCCH subframe means a subframe that includes the PDCCH. For example, in a TDD configuration, DL subframes and downlink pilot time slot (DwPTS) subframes correspond to PDCCH subframes. The subframes that are configured with respect to a relay node (RN) but are not suspended correspond to the PDCCH subframes.

Referring to FIG. 15, while the on-duration timer 1515 is operated in the DRX cycle 1500, the active time 1505 is configured as long as a DRX command MAC CE (DRX command MAC Control Element) 1550 is not received, and if the DRX command MAC CE 1550 is received, the on-duration timer 1515 is stopped, and the non-active time 1510 is configured. The length of the on-duration timer 1515 is in the range of psf1 to psf200, that is, in the range from one PDCCH subframe to 200 PDCCH-subframes.

The DRX inactivity timer starts when a PDCCH that indicates new transmission is received, and is stopped when the DRX command MAC CE is received.

The DRX retransmission timer starts when data decoding is not successfully performed in the corresponding HARQ procedure in a HARQ RTT (Round Trip Time). If a PDCCH that includes a grant message is received with respect to the corresponding process, the DRX retransmission timer is stopped.

Figure 16:
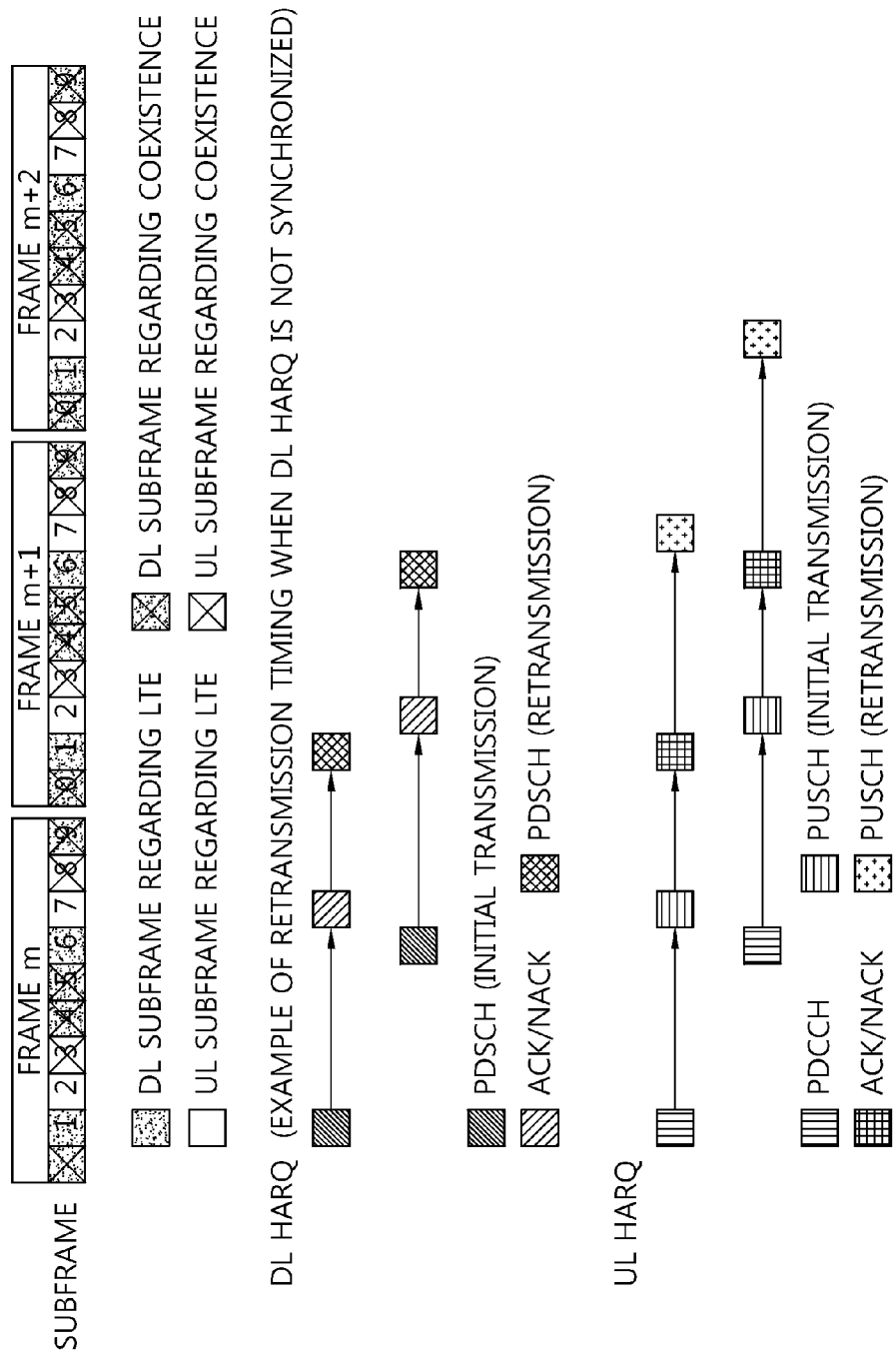
FIG. 16 shows bitmap pattern information as TDM pattern information determined based on HARQ applied to the present invention.

FIG. 16 shows bitmap pattern information as TDM pattern information determined based on HARQ applied to the present invention.

Referring to FIG. 16, when data is transmitted based on the HARQ, the retransmission signal may be protected. Here, protection means that the retransmission is certainly performed. If the retransmission is not performed to relieve or avoid the coexistence interference within a device, the performance of the system may be significantly deteriorated. The transmission pattern is determined in consideration of the retransmission cycle based thereon. Subframes 1 and 6 are reserved in advance for DL transmission, and subframes 2 and 7 are reserved for UL transmission. They are called scheduled subframes. The unscheduled subframes for the reduction of the coexistence interference within the device are subframes which should not be used for ISM band protection.

Such a pattern may be given in a bitmap pattern. That is, the number of subframes indicated by one bit may be 1 or more.

The cycle of the pattern is the product of the entire length of the bitmap multiplied by the number of subframes per bit, and each bit may be set to have 0 if the subframe indicated by the bit is a scheduled subframe, and to have 1 if the subframe is unscheduled subframe. In contrast, each bit may be set to have 1 if the subframe indicated by each bit is a scheduled subframe, and to have 0 if the subframe is an unscheduled subframe.

For example, it is assumed that the cycle is 20, the pattern indicating the subframe is "1001001000", the value of the unscheduled subframe is 0, and the number of subframes indicated by one bit is 2. In the pattern indicating the subframe, the value of the first, fourth and seventh bits is 1, it is understood that and thus subframes 0, 1, 6, 7, 12, and 13 are scheduled subframes per cycle.

Figure 17:
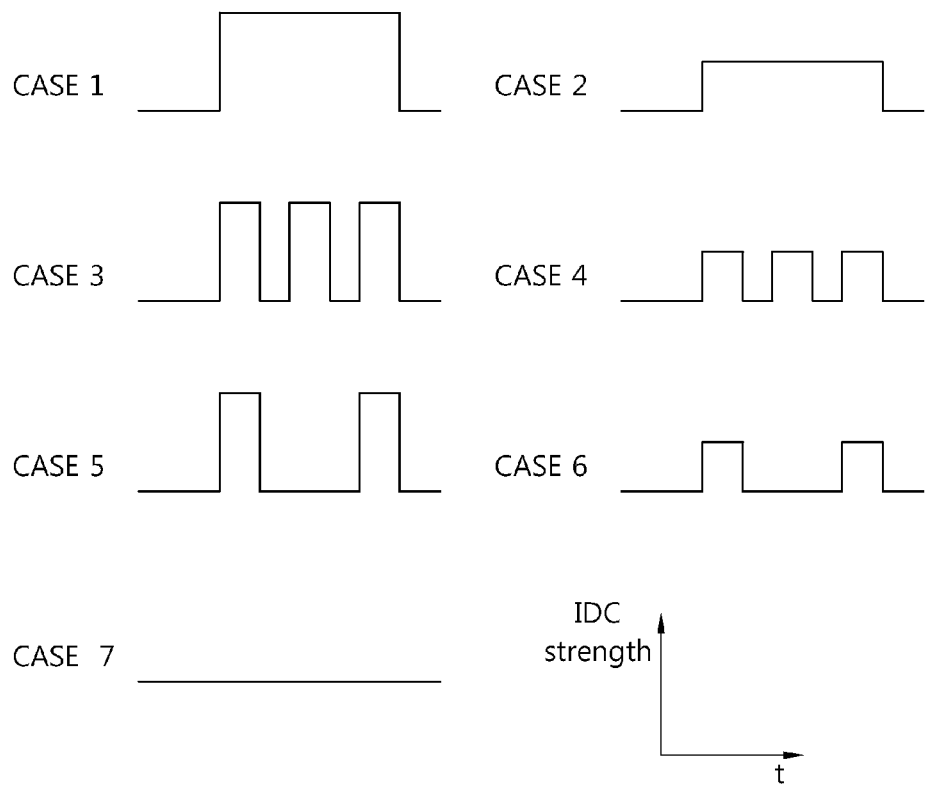
FIG. 17 shows a case where a terminal receives an interference signal within the device.

FIG. 17 shows a case where a terminal receives an interference signal within the device. 7 cases may be defined based on the frequency and strength or power of the interference.

Referring to FIG. 17, the 7 cases may be classified into 4 patterns based on the frequency of interference. For example, cases 1 and 2 are continuous patterns, cases 3 and 4 are bursty patterns, cases 5 and 6 are sparse patterns, and case 7 is a non-existence pattern.

If the 7 cases are classified as three patterns based on three patterns based on the strength of the interference, cases 1, 3 and 5 are too strong patterns, cases 2, 4, and 6 are enough weak patterns, and case 7 is a none pattern.

For example, the case of the on-going IDC of the terminal may correspond to case 1 or 3. The above cases are cases where at least interference is continuous or frequent, and the strength is very strong.

Furthermore, the state where the IDC is not on-going, but the in-device coexistence interference has occurred, and the coexistence interference may be changed to the ongoing state is defined as "potential in-device coexistence interference exists" (potential IDC possible)

For example, the terminal may determine that cases 2, 4, 4, and 6 of FIG. 17 are potential IDC possible. As another example, the terminal may determine that only case 5 having a very high strength is potential IDC possible. In the potential IDC possible frequency band, the handover or RRC setting/resetting, etc. are not impossible, and the terminal may perform measurement.

As another example, the case when it is determined that the IDC is ongoing may be cases 1, 2, 3, and 4. The cases are the cases when the interference is continuous or frequent and the strength of the interference is not considered.

Furthermore, cases 5 and 6 may be defined as "potential in-device coexistence inference exists."

As another example, whether the IDC is ongoing or not may determined after considering influences of all of interference between IDC and cell (interference of co-channel serving and non-serving cells, adjacent channel inference, etc.) and the thermal noise. That is, IDC ongoing state may be defined for cases when the influences of all of IDC, inter-cell interference, adjacent channel interference and thermal noise are strong and frequent. For example, when considering only the IDC in FIG. 17, when corresponding to case 2 or case 4, if the inter-cell interference, adjacent channel interference, thermal noise, etc. are significant, it may be understood as IDC ongoing.

Hereinafter, a method and an apparatus for transmitting control information for controlling In-Device Coexistence (IDC) interference according to the present invention will be described. In the description below, an operation of reducing, avoiding or removing interference will be referred to as interference control, interference coordination or interference solution.

Figure 18:
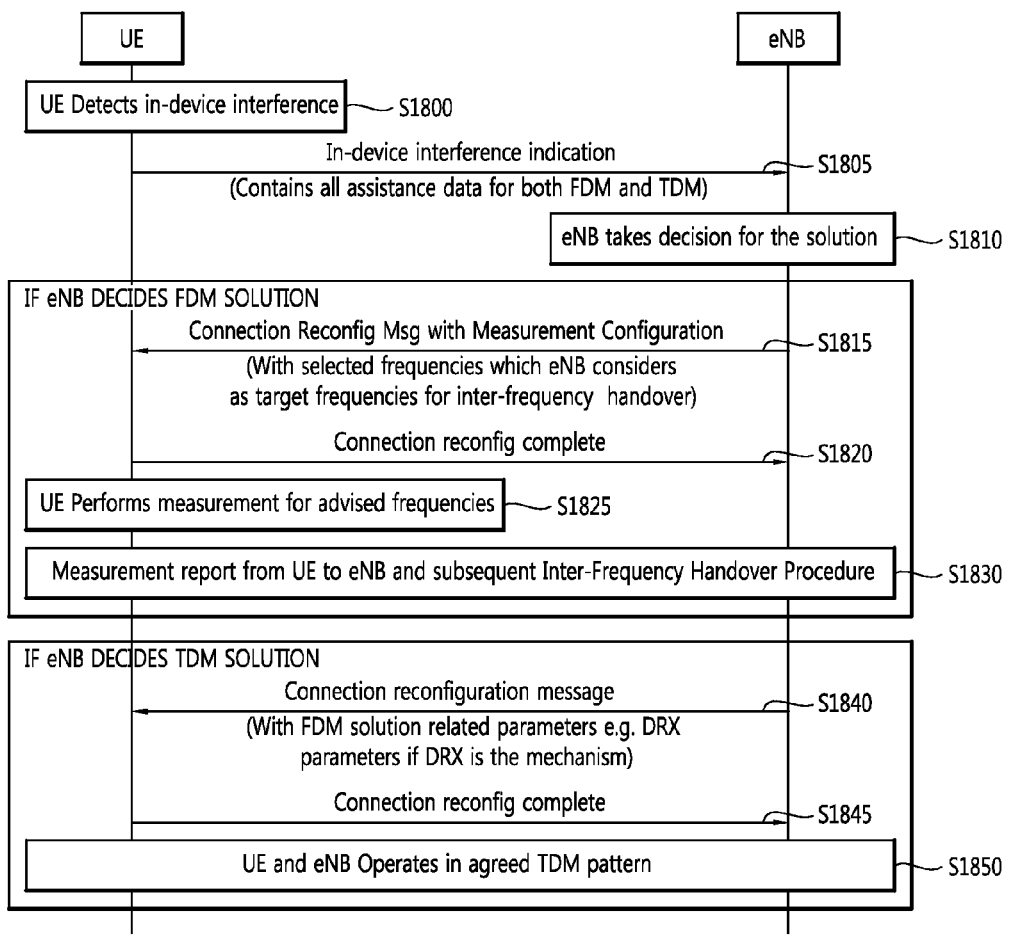
FIG. 18 illustrates an IDC procedure according to the present invention.

FIG. 18 illustrates an IDC procedure according to the present invention.

Referring to FIG. 18, a UE detects In-Device Coexistence IDC interference (S1800).

The UE transmits an IDC indication to an eNB (S1805). Here, IDC assistant information which is helpful in applying frequency division multiplexing (FDM) and time division multiplexing (TDM) solution is transmitted to the eNB. The IDC assistance information may be transmitted by an IDC indication message (InDeviceCoexIndication message).

Table 2 below shows an example of the IDC indication message. Here, the IDC indication message does not necessarily include all fields of Table 2 below, and may include only some of the fields.

TABLE 2

| | | | |
|---|---|---|---|
| InDeviceCoexIndication-r11 ::= | SEQUENCE { | | |
| criticalExtensions | CHOICE { | | |
| c1 | CHOICE { | | |
| inDeviceCoexIndication-r11 | InDeviceCoexIndication-r11-IEs, | | |
| spare3 NULL, spare2 NULL, spare1 NULL | | | |
| }, | | | |
| criticalExtensionsFuture | SEQUENCE { } | | |
| } | | | |
| } | | | |
| InDeviceCoexIndication-r11-IEs ::= | SEQUENCE { | | |
| affectedCarrierFreqList-r11 | IdcCarrierFreqList-r11 | OPTIONAL, | |
| availableMeasurementResults-r11 | AvailableMeasurementResults-r11 | OPTIONAL, | |
| tdm-AssistanceInfo-r11 | TDM-AssistanceInfo-r11 | OPTIONAL, | |
| lateNonCriticalExtension | OCTET STRING | OPTIONAL, | |
| nonCriticalExtension | SEQUENCE { } | OPTIONAL | |
| } | | | |
| AvailableMeasurementResults-r11 ::= | SEQUENCE { | | |
| measResultListEUTRA-r9 | MeasResultList2EUTRA-r9 | OPTIONAL, | |
| measResultListUTRA-r9 | MeasResultList2UTRA-r9 | OPTIONAL, | |
| measResultListGERAN-r9 | MeasResultListGERAN | OPTIONAL, | |
| measResultsCDMA2000-r9 | MeasResultList2CDMA2000-r9 | OPTIONAL | |
| } | | | |
| TDM-AssistanceInfo-r11 ::= | CHOICE { | | |
| drx-AssistanceInfo-r11 | SEQUENCE { | | |
| drs-CyeleLength-r11 | ENUMERATED {FFS}, | | |

TABLE 2-continued

|  |  |
|---|---|
| drx-Offset-r11 | ENUMERATED {FFS}, |
| drx-ActiveTime-r11 | ENUMBERATED {FFS} |
| }, | |
| idc-SubframePattern-r11 SEQUENCE { | |
| idc-SubframePatternList-r11 | IDC-SubframePatternList-r11 |
| }, | |
| ... | |
| } | |

Here, further explanation of each field is described in Table 3 below.

TABLE 3

InDeviceCoexIndication field descriptions affectedCarrierFreqList

List of E-UTRA carrier frequencies affected by IDC problems. Absence of the field indicates that there is no IDC problem.
availableMeasurementResults Available measurements for the carrier frequencies the UE is configured to measure.
drx-CycleLength Indicates the desired DRX cycle length that the E-UTRAN is recommended to configure.
drx-Offset Indicates the desired DRX starting offset that the E-UTRAN is recommended to configure.
drx-ActiveTime Indicates the desired active time that the E-UTRAN is recommended to configure.
idc-SubframePattern A list of one or more subframe patterns indicating the desired subframe reservation patterns that the E-UTRAN is recommended to abstain from using. The desired subframe patters shall follow HARQ time line, i.e, HARQ assignments/grants, HARQ transmissions, HARQ retransmissions and HARQ feedbacks shall be possible for each HARQ process included in the pattern. The first/leftmost bit corresponds to the subframe #0 of the radio frame satisfying SFN mod x = 0, where x is the size of the bit string divided by 10. "0" denotes that the corresponding subframe is not used in LTE Here, "IdcCarrierFreqList", one of information elements, is used to indicate ARFCN (or EARFCN) value, and is used to indicate an interference direction of one or more EUTRA carrier frequencies.

An example of "IdcCarrierFreqList" is shown in Table 4 below.

TABLE 4

IdcCarrierFreqList-r11::=SEQUENCE{SIZE{1..maxFreq-r11}}OF UnusableFreq-r11
UnusableFreq-r11 ::= SEQUENCE {
    carrierFreq          ARFCN-ValueEUTRA
    interferedRadio-r11    ENUMERATED {eutra, other, both, free}
                              OPTIONAL
}

In Table 4, "interferedRadi-r11" is an information element indicating the direction of the influence of the IDC interference within the UE. That is, the information element indicates which radio of the UE is interfered. The corresponding direction may be understood as the IDC interference direction.

If "IdcCarrierFreqList" corresponding to the unusable frequency list does not exist in the signaling, the current state may mean a state without IDC. That is, the state means a state where an IDC problem does not occur within a frequency which is set by a measurement configuration. Such a state may be referred to as "IDC over".

In contrast, one or a plurality of unusable frequencies may occur, and the interference direction may be defined for each unusable frequency as described above.

Figure 19:
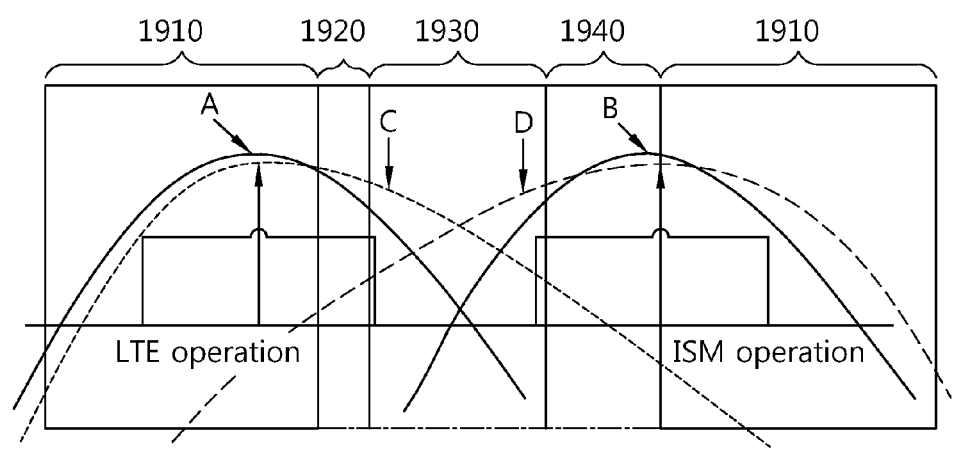
FIG. 19 shows an example of an IDC interference direction.

FIG. 19 shows an example of an IDC interference direction.

Referring to FIG. 19, solid lines A and B briefly illustrate the intensity of a self-received signal in a filter form in each communication system.

Dotted lines C and D briefly illustrate the intensity of an IDC interference reception signal in a filter form in each communication system. That is, the dotted lines briefly illustrate, in the filter form, the intensity of the corresponding signal when transmission in another system is received as IDC interference.

Here, in the case of domain 1910, the intensity of an endpoint of each communication system is relatively greater than the intensity of a signal of another system, the domain may become an IDC interference free area, which corresponds to "free" in the signaling of Table 4 above.

In the above signaling, in the case of domain 1920, A and C are significantly larger than B and D, and thus the influence of IDC interference may cause a problem in reception of ISM, GNSS, etc., which corresponds to "other" in the signal of Table 4 above. This implies that there is a problem in reception of a system (e.g., ISM or GNSS) other than long term evolution (LTE).

In the case of domain 1930, C and D are relatively larger than A and B, and thus there may be a problem in reception of all of LTE, ISM and GNSS, which corresponds to "both" in the signaling of Table 4 above.

In the case of domain 1940, B and D are significantly larger than A and C, and thus the influence of IDC interference may cause a problem in reception of LTE, which corresponds to "eutra" of the signaling of Table 4 above.

As described above, frequency domains 1920, 1930 and 1940 may have different IDC interference directions. Thus, the IDC indication message includes different IDC interference direction information (or direction indicator) for each usable frequency domain.

FIG. 19 is an example of the IDC interference influence of LTE UL on ISM DL and the IDC interference influence of ISM UL on LTE DL. However, when LTE UL and ISM UL are simultaneously transmitted according to implementation of the UE, a certain domain of the LTE DL may be interfered by the envelope of a waveform of UL transmission.

Figure 23:
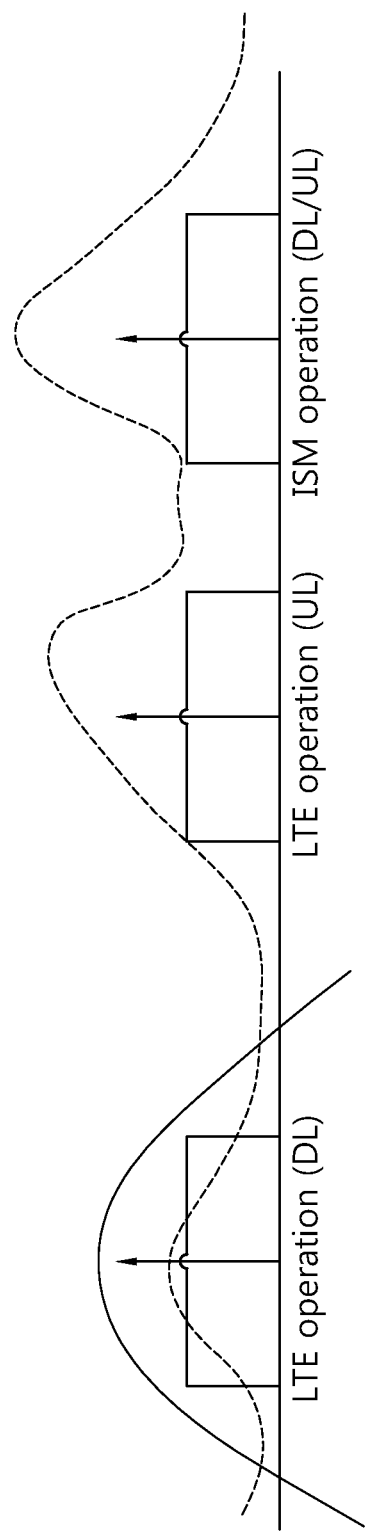
FIG. 23 shows a situation where a certain domain of LTE DL is influenced by interference by the envelope of the waveform of UL transmission when the LTE UL and ISM UL are simultaneously transmitted.

FIG. 23 shows a situation where a certain domain of LTE DL is influenced by interference by the envelope of the waveform of UL transmission when the LTE UL and ISM UL are simultaneously transmitted.

Referring to FIG. 23, the IDC interference direction between the LTE UL and the ISM DL may become "other". However, the IDC interference direction may become "LTE" for LTE DL.

Likewise, the direction of the interference includes different IDC interference direction indicators for the unusable frequency domain.

Referring back to FIG. 18, after operation S1805 is performed, the eNB takes an IDC solution (S1810).

In one aspect, if the eNB takes the FDM solution in step S1810, operations S1815 to S1830 are performed between the UE and the eNB.

The eNB transmits a radio resource control (RRC) connection reconfiguration message along with a measurement configuration to the UE (S1815). Selected frequencies which the eNB considers as target frequencies for the inter-frequency handover may also be transmitted.

After operation S1815, the UE transmits the RRC connection reconfiguration completion to the eNB (S1820).

Operations S1815 to S1820 may be omitted if the measurement configuration has already been set for the target frequencies before the IDC indication operation occurs.

Thereafter, the UE performs measurement for advised (or recommended) frequencies (S1825).

And the UE performs a measurement report to the eNB (S1830). Thereafter, the inter-frequency handover procedure may be performed.

In other aspect, if the eNB determines the TDM solution in step S1810, operations S1840 to S1850 are performed between the UE and the eNB.

The eNB transmits the RRC connection reconfiguration message to the UE (S1840). Here, the TDM solution-related parameters (e.g., DRX parameter if DRX is the mechanism) may be transmitted together.

The UE transmits the connection reconfiguration complete message to the eNB (S1845).

The UE and the eNB are operated in an agreed TDM pattern (S1850). For example, DRX operation may be performed in an agreed DRX pattern.

Figure 20:
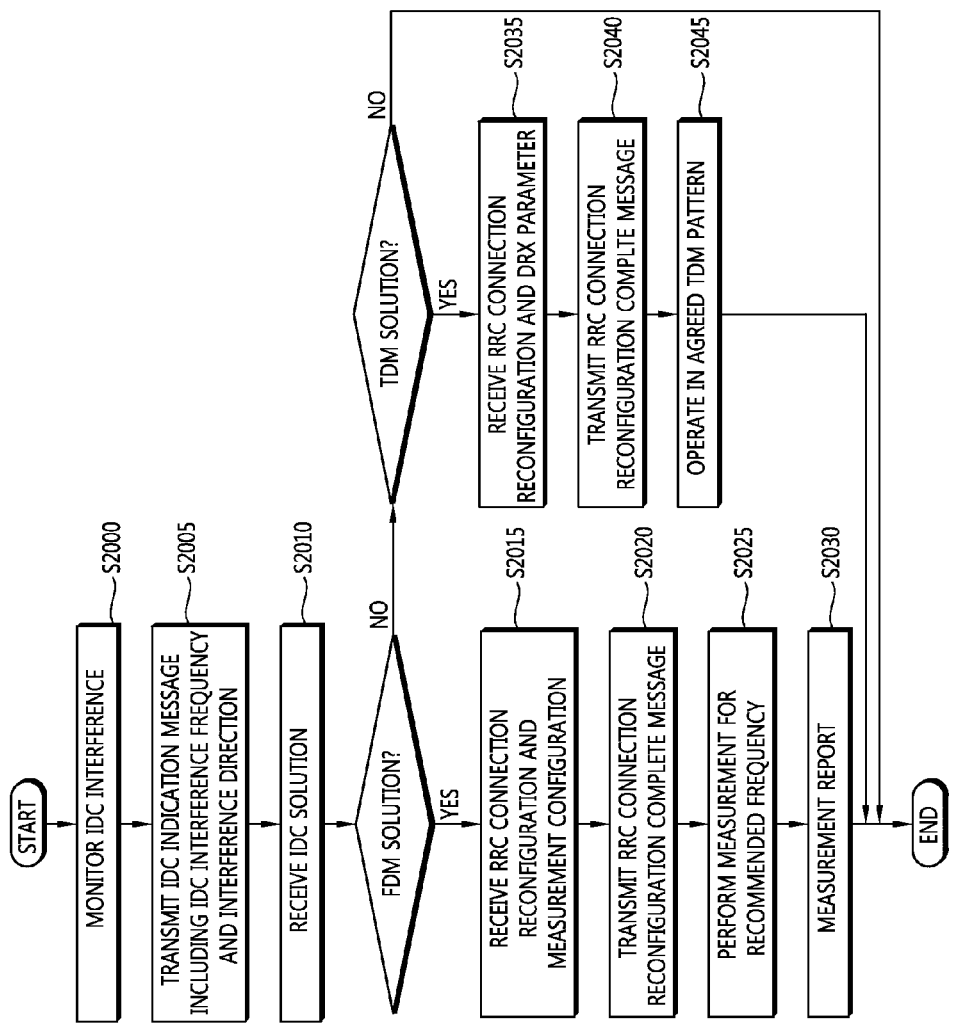
FIG. 20 is a flowchart illustrating an operation of a UE according to an embodiment of the present invention.

FIG. 20 is a flowchart illustrating an operation of a UE according to an embodiment of the present invention.

Referring to FIG. 20, the UE detects or monitors IDC interference (S2000).

The UE checks the direction of the detected IDC interference, configures to include the direction information in the list of frequencies influenced by the IDC interference, and transmits an IDC indication message including the frequency list to the eNB (S2005).

That is, the IDC indication message may include the list of frequencies influenced by the IDC (e.g., IdcCarrierFreqList of Table 2 above). Furthermore, the IDC-influenced frequency list may include IDC-influenced frequency information and IDC direction information on the direction of the influence of the IDC interference in the frequency.

As another example, absence of IDC-influenced frequency list which is an unusable frequency list may imply a state without IDC, that is, a state where an IDC problem does not occur within a frequency which is set by the measurement configuration.

Furthermore, the unusable frequency may be one frequency or a plurality of frequencies, and in the case of a plurality of frequencies, the interference direction may be defined for each of the usable frequencies.

Furthermore, in succession of operation S2005, the UE receives an IDC solution from the eNB (S2010).

If the IDC solution is the FDM solution in step S2010, the UE receives the RRC connection reconfiguration message along with the measurement configuration from the eNB (S2015). The UE may also receive a selected frequency, which is considered as a target frequency for the inter-frequency handover. The UE transmits the RRC connection reconfiguration complete message to the eNB (S2020).

Thereafter, the UE performs measurement of the recommended frequency (S2025).

Furthermore, the UE transmits a measurement report to the eNB (S2030). Here, the inter-frequency handover procedure may be followed.

If the IDC solution is the TDM solution in step S2010, the UE receives the RRC connection reconfiguration message from the eNB (S2040), and the parameters (e.g., DRX parameter) related with the TDM solution may also be received.

The UE transmits the connection reconfiguration complete message to the eNB (S2045).

The UE operates in a TDM pattern which is agreed with the eNB (S2050). For example, the DRX operation may be performed in the agreed DRX pattern.

Figure 21:
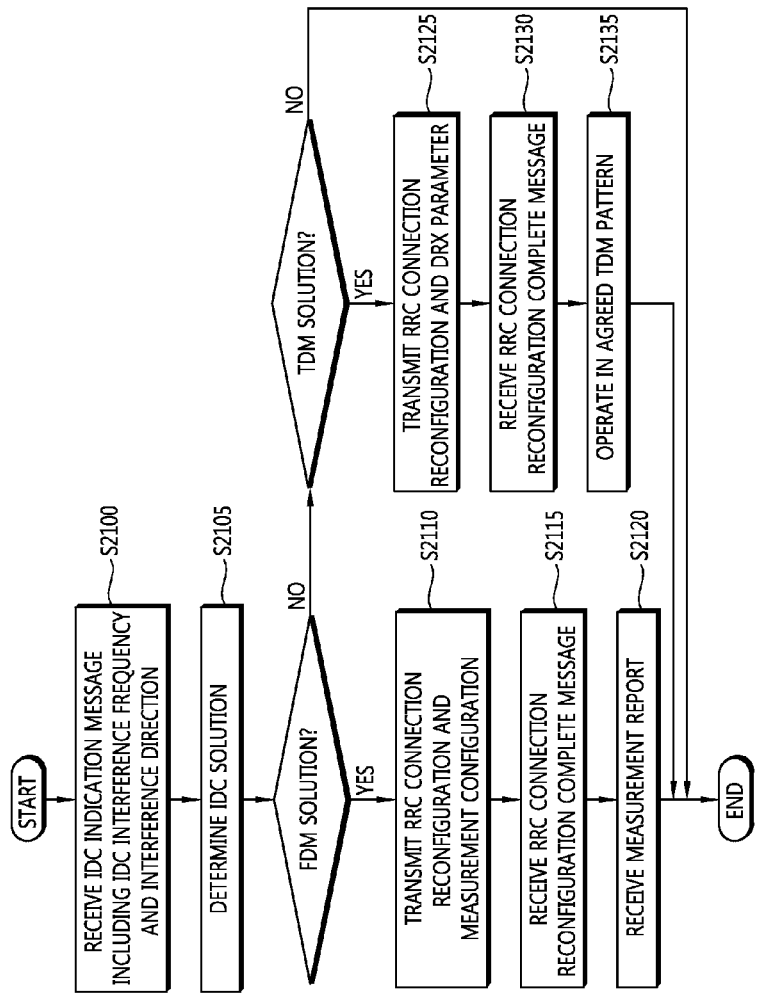
FIG. 21 is a flowchart illustrating an operation of the eNB according to an embodiment of the present invention.

FIG. 21 is a flowchart illustrating an operation of the eNB according to an embodiment of the present invention.

Referring to FIG. 21, the eNB receives, from the UE that detects the IDC interference, the IDC indication message including the IDC-influenced frequency list (e.g., IdcCarrierFreList of Table 2 above) including the IDC-influenced frequency information and the IDC direction information on the direction of the influence of the IDC interference in the frequency (S2100).

The eNB determines one of the FDM solution and the TDM solution as the IDC solution, based on the IDC-influenced frequency information and IDC direction information (S2105).

If the eNB determines the FDM solution as the IDC solution in step S2105, the eNB transmits the RRC connection reconfiguration message along with the measurement configuration to the UE (S2110), and the eNB receives the RRC connection reconfiguration complete message from the UE (S2115). The RRC connection reconfiguration message may be transmitted along with the frequency that is considered as the target frequency for the inter-frequency handover. Steps S2110 to S2115 may be omitted if the measurement configuration has been appropriately performed for the target frequency before the IDC indication occurs.

The eNB receives from the UE the measurement report including the result of the measurement that has been performed for the recommended frequencies based on the measurement setting (S2120). At this time, the inter-frequency handover procedure may be followed.

If the eNB determines the TDM solution as the IDC solution at step S2105, the eNB transmits the RRC connection reconfiguration message to the UE (S2125), and receives the connection reconfiguration complete message from the UE (S2130). The parameters (e.g., DRX parameter) related with the TDM solution may be transmitted along with the RRC connection reconfiguration message.

The eNB is operated in an agreed TDM pattern along with the UE (S2135). For example, the DRM operation may be performed in the agreed DRX pattern.

Figure 22:
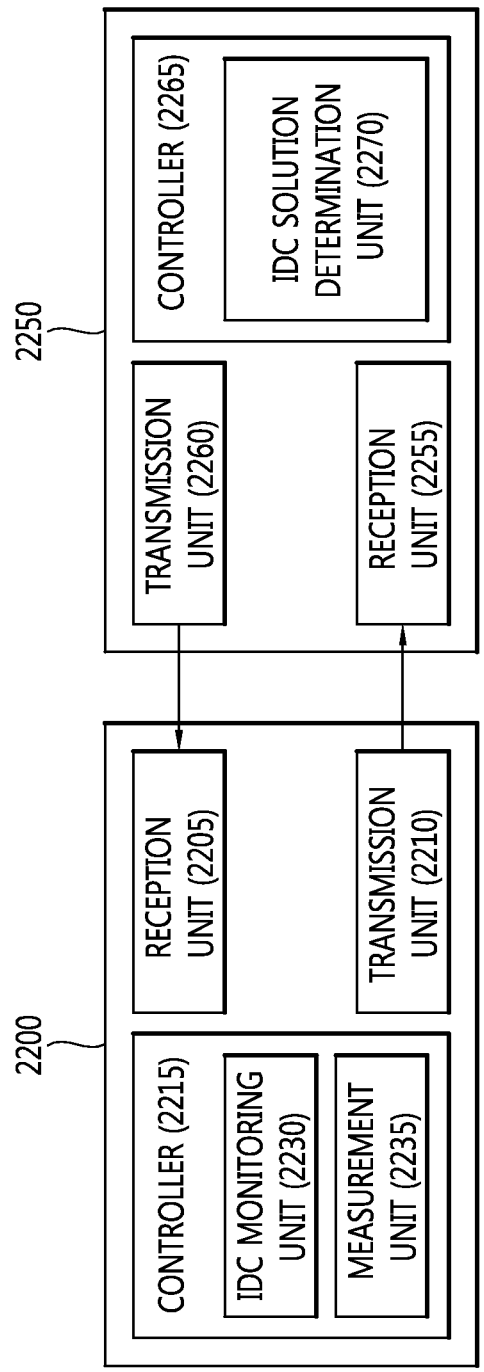
FIG. 22 is a block diagram illustrating an apparatus according to an embodiment of the present invention.

FIG. 22 is a block diagram illustrating an apparatus according to an embodiment of the present invention.

Referring to FIG. 22, the UE 2200 includes a reception unit 2205, a transmission unit 2210 or a controller 2215, and the controller 2215 may further include an IDC monitoring unit 2230 or a measurement unit 2235.

The IDC detecting unit 2230 detects or monitors IDC interference.

The IDC monitoring unit 2230 may determine the direction of the detected IDC interference.

The controller 2215 is configured to include the direction information of the IDC interference in the list of frequencies influenced by the IDC interference.

The transmission unit 2210 transmits the direction information to the eNB 2250 through the IDC indication message including the list of frequencies influenced by the IDC interference.

The IDC indication message may include the IDC-influenced frequency list (e.g., IdcCarrierFreList of Table 2 above).

As an example, the IDC-influenced frequency list may include IDC-influenced frequency information and IDC direction information on the direction of the influence of the IDC interference in the frequency.

As another example, when there is no IDC-influenced frequency list which is an unusable frequency list, the situation may imply a state without IDC. That is, the situation may mean a state without an IDC problem within frequencies that are set by measurement setting.

Furthermore, one or a plurality of unusable frequencies may occur, and the interference direction may be defined for each unusable frequency.

The reception unit 2205 receives the IDC solution determined by the eNB 2250 from the eNB 2250.

If the IDC solution is the DFM solution, the reception unit 2205 receives the RRC connection reconfiguration message along with the measurement configuration from the eNB 2250.

The reception unit 2205 may receive the selected frequency considered as the target frequency for the inter-frequency handover along with the RRC connection reconfiguration message.

The transmission unit 2210 transmits the RRC connection reconfiguration complete message to the eNB 2250.

The measurement unit 2235 performs the measurement configuration for the recommended frequencies.

The transmission unit 2210 performs the measurement report to the eNB 2250. Here, the inter-frequency handover procedure may be followed.

If the IDC solution is the TDM solution, the reception unit 2205 receives the RRC connection reconfiguration message from the eNB 2250, and may also receive the parameters (e.g., DRX parameter) related with the TDM solution.

The transmission unit 2210 transmits the connection reconfiguration complete message to the eNB 2250.

The UE 2200 is operated in an agreed TDM pattern. For example, the DDX operation may be performed in an agreed DRX pattern.

Furthermore, the eNB 2250 includes a reception unit 2255, a transmission unit 2260, or a controller, and the controller 2265 may further include a determination unit 2270.

The reception unit 2255 receives, from the UE 2200 detecting the influence of the IDC interference, the IDC indication message including the list of frequencies influenced by the IDC (e.g., IdcCarrierFreList of Table 2) containing IDC-influenced frequency information and IDC direction information on the direction of the influence of the IDC interference in the frequency.

Furthermore, the IDC solution method determination unit 2270 determines the IDC solution method based on IDC-influenced frequency information and IDC direction information.

If the IDC solution determination unit 2270 determines the FDM solution, the transmission unit 2260 transmits the RRC connection reconfiguration message along with the measurement configuration to UE, and the frequency considered as the target frequency for the inter-frequency handover may also be transmitted.

The reception unit 2255 receives the RRC connection reconfiguration complete message from the UE 2200.

The reception unit 2255 receives the measurement report including the measurement result performed for the recommended frequencies from the UE 2200 based on the measurement configuration. Then the inter-frequency handover procedure may be followed.

If the IDC solution determination unit 2270 determines the TDM solution, the transmission unit 2260 transmits the RRC connection reconfiguration message to the UE 2200, and the parameters (e.g., DRX parameter) related with the TDM solution may be transmitted along with the RRC connection reconfiguration message.

The reception unit 2255 receives the connection reconfiguration complete message from the UE 2200.

The eNB 2250 operates in an agreed TDM pattern along with the UE 2200. For example, the DRX operation may be performed in an agreed DRX pattern.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of transmitting control information by a user equipment (UE) in a wireless communication system, the method comprising:

configuring an "In Device Coexistence" (IDC) indication message including an affected carrier frequency list; and transmitting the IDC indication message to an evolved NodeB (eNB);

wherein the affected carrier frequency list includes at least one affected carrier frequency information element, each affected carrier frequency information element comprises a value of a carrier frequency affected by an IDC interference and an interference direction indicator indicating a direction of the IDC interference regarding the affected carrier frequency, wherein the interference direction indicator indicates "eutra", when the IDC interference affects signal reception in radio frequency bandwidth related to a long term evolution (LTE).

2. The method of claim 1, wherein the direction of the IDC interference is defined for each affected carrier frequency.

3. The method of claim 1, wherein the interference direction indicator indicates "other", when the IDC interference affects signal reception in radio frequency bandwidth related to a non-long term evolution (non-LTE).

4. The method of claim 1, wherein the interference direction indicator indicates "both", when the IDC interference affects signal reception in radio frequency bandwidth related to both a long term evolution (LTE) and a non-LTE.

5. A user equipment (UE) for transmitting control information in a wireless communication system, the UE comprising:
- a transmission unit which transmits, to an evolved NodeB (eNB), an "In Device Coexistence" (IDC) indication message including an affected carrier frequency list; and
- a controller which configures the IDC indication message,
- wherein the affected carrier frequency list includes at least one affected carrier frequency information element, each affected carrier frequency information element comprises a value of a carrier frequency affected by an IDC interference and an interference direction indicator indicating a direction of the IDC interference regarding the affected carrier frequency,
- wherein the interference direction indicator indicates "eutra", when the IDC interference affects signal reception in radio frequency bandwidth related to a long term evolution (LTE).

6. The UE of claim 5, wherein the direction of the IDC interference is defined for each affected carrier frequency.

7. The UE of claim 5, wherein the interference direction indicator indicates "other", when the IDC interference affects signal reception in radio frequency bandwidth related to a non-long term evolution (non-LTE).

8. The UE of claim 5, wherein the interference direction indicator indicates "both", when the IDC interference affects signal reception in radio frequency bandwidth related to both a long term evolution (LTE) and a non-LTE.

9. A method of receiving control information by an eNodeB (eNB) in a wireless communication system, the method comprising:
- receiving an "In Device Coexistence" (IDC) indication message including an affected carrier frequency list from a user equipment (UE) which detects an IDC interference; and
- determining an IDC solution based on the IDC indication message,
- wherein the affected carrier frequency list includes at least one affected carrier frequency information element, each affected carrier frequency information element comprises a value of a carrier frequency affected by an IDC interference and an interference direction indicator indicating a direction of the IDC interference regarding the affected carrier frequency,
- wherein the interference direction indicator indicates "eutra", when the IDC interference affects signal reception in radio frequency bandwidth related to a long term evolution (LTE).

10. The method of claim 9, wherein the direction of the IDC interference is defined for each affected carrier frequency.

11. The method of claim 9, wherein the interference direction indicator indicates "other", when the IDC interference affects signal reception in radio frequency bandwidth related to a non-long term evolution (non-LTE).

12. The method of claim 9, wherein the interference direction indicator indicates "both", when the IDC interference affects signal reception in radio frequency bandwidth related to both a long term evolution (LTE) and a non-LTE.

13. The method of claim 9, if the IDC solution is a frequency division multiplexing (FDM) solution, further comprising:
- transmitting a radio resource control (RRC) connection reconfiguration message along with a measurement configuration to the UE,
- wherein the RRC connection reconfiguration message includes a selected frequency considered as a target frequency for an inter-frequency handover.

14. The method of claim 9, if the IDC solution is a time division multiplexing (TDM) solution, further comprising:
- transmitting an RRC connection reconfiguration message along with a DRX parameter to the UE; and
- operating in a TDM pattern which agreed by the DRX parameter.

15. An eNodeB (eNTB) for receiving control information in a wireless communication system, the eNB comprising:
- a reception unit that receives an "In Device Coexistence" (DC) indication message including an affected carrier frequency list from a user equipment (UE) that detects an IDC interference; and
- an IDC solution determination unit that determines an IDC solution based on the IDC indication message,
- wherein the affected carrier frequency list includes at least one affected carrier frequency information element, each affected carrier frequency information element comprises a value of a carrier frequency affected by an IDC interference and an interference direction indicator indicating a direction of the DC interference regarding the affected carrier frequency,
- wherein the interference direction indicator indicates at least one of "eutra", "other", and "both",
- wherein "eutra" indicates the IDC interference affecting signal reception in radio frequency bandwidth related to a long term evolution (LTE), "other" indicates the IDC interference affecting signal reception in radio frequency bandwidth related to non-LTE, and "both" indicates the IDC interference affecting signal reception in radio frequency bandwidth related to both the LTE and the non-LTE.

16. The eNB of claim 15, wherein the direction of the IDC interference is defined for each carrier frequency.

* * * * *